US011928910B2

(12) United States Patent
Jafa et al.

(10) Patent No.: US 11,928,910 B2
(45) **Date of Patent: *Mar. 12, 2024**

(54) LEAN VENDING MACHINE

(71) Applicant: PepsiCo, Inc., Purchase, NY (US)

(72) Inventors: Emad Jafa, Brewster, NY (US); Xuejun Li, White Plains, NY (US); Ovidiu Butnaru, Brasov (RO); Claudiu Iov, Brasov (RO); Marius Mihaila, Brasov (RO); Jozsef Sandor, Brasov (RO); Andrei Smitko, Brasov (RO)

(73) Assignee: PepsiCo, Inc., Purchase, NY (US)

(*) Notice: Subject to any disclaimer, the term of this patent is extended or adjusted under 35 U.S.C. 154(b) by 167 days.

This patent is subject to a terminal disclaimer.

(21) Appl. No.: 17/499,675

(22) Filed: Oct. 12, 2021

(65) Prior Publication Data

US 2022/0139147 A1 May 5, 2022

Related U.S. Application Data

(63) Continuation of application No. 16/691,060, filed on Nov. 21, 2019, now Pat. No. 11,170,599, which is a (Continued)

(51) Int. Cl.

| | |
|---|---|
| ***G07F 11/42*** | (2006.01) |
| ***G07F 11/00*** | (2006.01) |
| ***G07F 11/16*** | (2006.01) |

(52) U.S. Cl.

CPC .......... *G07F 11/005* (2013.01); *G07F 11/165* (2013.01); *G07F 11/42* (2013.01)

(58) Field of Classification Search

None

See application file for complete search history.

(56) References Cited

U.S. PATENT DOCUMENTS

| | | | |
|---|---|---|---|
| 3,537,330 | A | 11/1970 | Deshon et al. |
| 3,592,305 | A | 7/1971 | Schwertfeger |

(Continued)

FOREIGN PATENT DOCUMENTS

| | | | |
|---|---|---|---|
| CN | 205507982 | U | 8/2016 |
| EP | 2363841 | A1 | 9/2011 |

(Continued)

OTHER PUBLICATIONS

International Search Report and Written Opinion of the International Searching Authority, 17 pages.

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A vending machine includes two horizontal lead screws, a vertical lead screw, first and second motors, a shelf, a delivery cup, and a delivery area. The first and second motors drive the horizontal lead screws and the vertical lead screw, respectively. The vertical lead screw moves horizontally along the horizontal lead screws. The shelf contains a product and has a movable gate to hold the product on the shelf. The delivery cup moves vertically along the vertical lead screw and has a solenoid and a plunger. The solenoid activates the plunger, which opens the gate to dispense the product onto the delivery cup. An outer door of the delivery area isolates the delivery area from outside the vending machine when closed and provides access to the product from outside the vending machine when open. A mechanical interaction between the delivery cup and the delivery area opens the outer door.

20 Claims, 27 Drawing Sheets

Related U.S. Application Data continuation of application No. 15/382,042, filed on Dec. 16, 2016, now Pat. No. 10,490,014.

(56) References Cited

U.S. PATENT DOCUMENTS

| | | | |
|---|---|---|---|
| 3,737,071 A | 6/1973 | Offutt et al. | |
| 3,884,363 A | 5/1975 | Ajlouny | |
| 4,030,632 A | 6/1977 | Harashima | |
| 4,167,104 A | 9/1979 | Bond | |
| 4,654,727 A | 3/1987 | Blum et al. | |
| 4,734,005 A | 3/1988 | Blumberg | |
| 4,779,151 A | 10/1988 | Lind et al. | |
| 4,814,592 A | 3/1989 | Bradt et al. | |
| 4,839,505 A | 6/1989 | Bradt et al. | |
| 4,846,619 A | 7/1989 | Crabtree et al. | |
| 4,971,120 A | 11/1990 | Credle, Jr. et al. | |
| 5,020,958 A | 6/1991 | Tuttobene | |
| 5,074,341 A | 12/1991 | Credle, Jr. et al. | |
| 5,139,384 A | 8/1992 | Tuttobene | |
| 5,150,817 A | 9/1992 | Livingston | |
| 5,210,387 A | 5/1993 | Smith et al. | |
| 5,259,530 A | 11/1993 | Ishine et al. | |
| 5,261,467 A | 11/1993 | Yamamoto et al. | |
| 5,379,229 A | 1/1995 | Parsons et al. | |
| 5,586,686 A | 12/1996 | Bustos et al. | |
| 5,791,512 A | 8/1998 | Kanatsuka | |
| 6,047,855 A | 4/2000 | Lin | |
| 6,098,841 A | 8/2000 | Katakai | |
| 6,199,720 B1 | 3/2001 | Rudick et al. | |
| 6,230,930 B1 | 5/2001 | Sorensen et al. | |
| 6,247,610 B1 | 6/2001 | Ziesel et al. | |
| 6,253,954 B1 | 7/2001 | Yasaka | |
| 6,286,715 B1 | 9/2001 | Ziesel et al. | |
| 6,328,180 B1 | 12/2001 | Sorensen et al. | |
| 6,412,654 B1 | 7/2002 | Cleeve | |
| 6,513,677 B1 | 2/2003 | Sorensen et al. | |
| 6,556,889 B2 | 4/2003 | Rudick et al. | |
| 6,582,037 B1 | 6/2003 | Rudick et al. | |
| 6,719,168 B2 | 4/2004 | Nicolini | |
| 6,758,370 B2 | 7/2004 | Cooke et al. | |
| 6,808,082 B2 | 10/2004 | Ohkubo | |
| 6,832,695 B2 | 12/2004 | Yamaguchi | |
| 6,966,455 B2 | 11/2005 | Skavnak | |
| 7,086,560 B2 | 8/2006 | Shioya | |
| 7,222,749 B2 | 5/2007 | Holdway et al. | |
| 7,478,597 B2 | 1/2009 | Schroeder et al. | |
| 7,802,700 B2 | 9/2010 | Arden et al. | |
| 8,392,019 B2 | 3/2013 | Segal et al. | |
| 8,534,494 B2 | 9/2013 | Black, Jr. et al. | |
| 8,556,119 B2 | 10/2013 | Skavnak et al. | |
| 8,820,574 B2 | 9/2014 | Howell et al. | |
| 8,893,922 B2 * | 11/2014 | Azzano | A47J 31/4403 221/96 |
| 9,292,994 B2 | 3/2016 | Rose, Jr. et al. | |
| 9,640,014 B2 | 5/2017 | Pritchard et al. | |
| 10,490,014 B2 | 11/2019 | Jafa et al. | |
| 2001/0000610 A1 | 5/2001 | Johnson | |
| 2002/0179619 A1 | 12/2002 | Geltser et al. | |
| 2004/0026442 A1 | 2/2004 | Hutchinson | |
| 2004/0238557 A1 | 12/2004 | Chirnomas | |
| 2004/0249502 A1 | 12/2004 | Truong et al. | |
| 2005/0049746 A1 | 3/2005 | Rosenblum | |
| 2005/0067426 A1 | 3/2005 | Holdway et al. | |
| 2005/0189370 A1 | 9/2005 | Carter et al. | |
| 2005/0284880 A1 | 12/2005 | Kenmochi | |
| 2006/0261080 A1 | 11/2006 | Matsumoto et al. | |
| 2007/0021866 A1 | 1/2007 | Coppola et al. | |
| 2007/0084875 A1 | 4/2007 | Percy | |
| 2008/0061076 A1 | 3/2008 | Hieb et al. | |
| 2008/0067187 A1 | 3/2008 | Rudick et al. | |
| 2008/0099496 A1 * | 5/2008 | Black | G07F 11/10 221/13 |
| 2008/0135574 A1 * | 6/2008 | Hieb | G07F 11/165 221/123 |
| 2008/0142537 A1 | 6/2008 | Howell et al. | |
| 2008/0179343 A1 | 7/2008 | Perkins et al. | |
| 2008/0290108 A1 | 11/2008 | Tsunoda et al. | |
| 2009/0084812 A1 * | 4/2009 | Kirschner | A47F 1/126 221/1 |
| 2011/0017761 A1 | 1/2011 | Roncari | |
| 2011/0226795 A1 | 9/2011 | Sichich | |
| 2012/0029687 A1 | 2/2012 | Hagen et al. | |
| 2012/0061418 A1 | 3/2012 | Ubidia et al. | |
| 2012/0222938 A1 | 9/2012 | Rose, Jr. et al. | |
| 2012/0277904 A1 | 11/2012 | Pritchard et al. | |
| 2014/0158706 A1 | 6/2014 | Chen et al. | |
| 2014/0367403 A1 | 12/2014 | Carpentier et al. | |
| 2016/0133083 A1 | 5/2016 | Erikawa et al. | |
| 2018/0108203 A1 | 4/2018 | Li et al. | |

FOREIGN PATENT DOCUMENTS

| | | |
|---|---|---|
| JP | 2001023013 A | 1/2001 |
| JP | 3524780 B2 | 5/2004 |
| JP | 2005535525 A | 11/2005 |
| JP | 2009288982 A | 12/2009 |

* cited by examiner

LEAN VENDING MACHINE

CROSS-REFERENCE TO RELATED APPLICATION

This application is a continuation of U.S. patent application Ser. No. 16/691,060, filed Nov. 21, 2019, which is a continuation of U.S. patent application Ser. No. 15/382,042, filed Dec. 16, 2016, the disclosures of which are each incorporated herein in their entireties by reference thereto.

BACKGROUND

Field

Embodiments of the present invention relate generally to vending machines, and more specifically to vending machines that present vending products to consumers without dropping the vending products.

Background

Vending machines are used to store and deliver products (e.g., beverages in bottles, cans, boxes, etc.) to consumers. Conventional vending machines often deliver the products by dropping the products into a pick-up space where the consumer opens a hinged door, for example, to retrieve the product. Other vending machines do not drop the products, but these vending machines require high levels of service and maintenance.

BRIEF SUMMARY OF THE INVENTION

In some embodiments, a vending machine includes two horizontal lead screws, first and second motors, a vertical lead screw, a shelf, a delivery cup, and a delivery area. In some embodiments, the first motor is coupled to and drives the two horizontal lead screws. In some embodiments, the vertical lead screw moves horizontally along the two horizontal lead screws. In some embodiments, the second motor is coupled to and drives the vertical lead screw. In some embodiments, the shelf contains a vending product and has a movable gate that holds the vending product on the shelf. In some embodiments, the delivery cup is coupled to the vertical lead screw and moves vertically along the vertical lead screw. In some embodiments, the delivery cup has a solenoid and a plunger. In some embodiments, the solenoid activates the plunger and the plunger opens the gate to dispense the vending product onto the delivery cup. In some embodiments, the delivery area has an outer door. In some embodiments, the outer door isolates the delivery area from an exterior of the vending machine when in a closed position and provides access to the vending product from the exterior of the vending machine through an opening when in an open position. In some embodiments, a mechanical interaction between the delivery cup and the delivery area moves the outer door to the open position.

In some embodiments, the first motor is disposed adjacent to the second motor. In some embodiments, the first and second motors are disposed outside of a storage space of the vending machine. In some embodiments, the vending machine includes a transparent front panel.

In some embodiments, the delivery cup includes a receptacle having an open side that faces the shelf and receives the vending product. In some embodiments, the mechanical interaction between the delivery cup and the delivery area rotates the delivery cup so that the open side aligns with the opening. In some embodiments, the mechanical interaction rotates the delivery cup and opens the outer door simultaneously. In some embodiments, the vending machine also includes a rack and a pinion gear. In some embodiments, the mechanical interaction comprises an interaction between the rack and the pinion gear.

In some embodiments, the gate comprises two side gates mechanically linked to a front plate. In some embodiments, the plunger pushes the front plate to open the two side gates. In some embodiments, the vending machine also includes a spring that closes the two side gates. In some embodiments, the vending machine also includes an optical sensor that detects when the gate is completely opened and provides a signal to the solenoid.

In some embodiments, the shelf is flat. In some embodiments, the vending machine also includes an ultrasound sensor disposed on the delivery cup. In some embodiments, the ultrasound sensor detects a vending product within the delivery cup.

In some embodiments, a vending machine includes an exterior body, a storage space within the exterior body, a delivery system, and a delivery area. In some embodiments, the storage space stores a vending product. In some embodiments, the delivery system is movable in an X-direction and a Y-direction. In some embodiments, the delivery system has a receptacle with an open side and a pinion gear mechanically linked to the receptacle. In some embodiments, the delivery area has a rack, an outer door, and a projection mechanically linked to the outer door and protruding through a slot. In some embodiments, the outer door isolates the delivery area from outside the exterior body in a closed position and provides access to the vending product from outside the exterior body in an open position. In some embodiments, a surface of the delivery system pushes the projection along the slot as the delivery system moves the vending product into the delivery area, thereby moving the outer door from the closed position to the open position. In some embodiments, the rack interacts with the pinion gear as the delivery system moves the vending product into the delivery area, thereby rotating the receptacle so that the open side faces an opening formed when the outer door is in the open position.

In some embodiments, the slot is curved and the outer door moves in a rotating manner. In some embodiments, the vending machine also includes an inner door between the delivery area and the storage space. In some embodiments, the delivery system mechanically opens the inner door.

In some embodiments, a method for vending a product to a consumer from a vending machine includes moving a delivery cup to align the delivery cup with a shelf containing the product, opening a gate of the shelf by activating a solenoid for a timed pulse, receiving the product into the delivery cup, and moving the delivery cup into a delivery area such that the product is presented in an upright manner to the consumer. In some embodiments, moving the delivery cup into the delivery area mechanically opens an outer door to allow access to the delivery area and mechanically rotates the delivery cup to provide the consumer access to the product. In some embodiments, the vending machine includes a transparent front panel.

In some embodiments, the method also includes closing the gate with a spring after the timed pulse. In some embodiments, the timed pulse allows only one product to be dispensed from the shelf. In some embodiments, the method also includes unlocking and opening an inner door to the delivery area.

In some embodiments, the method also includes removing the delivery cup from the delivery area after the product is removed by the consumer. In some embodiments, removing the delivery cup from the delivery area closes the outer door and closes and locks the inner door. In some embodiments, the transparent front panel comprises glass.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

Figure 1:
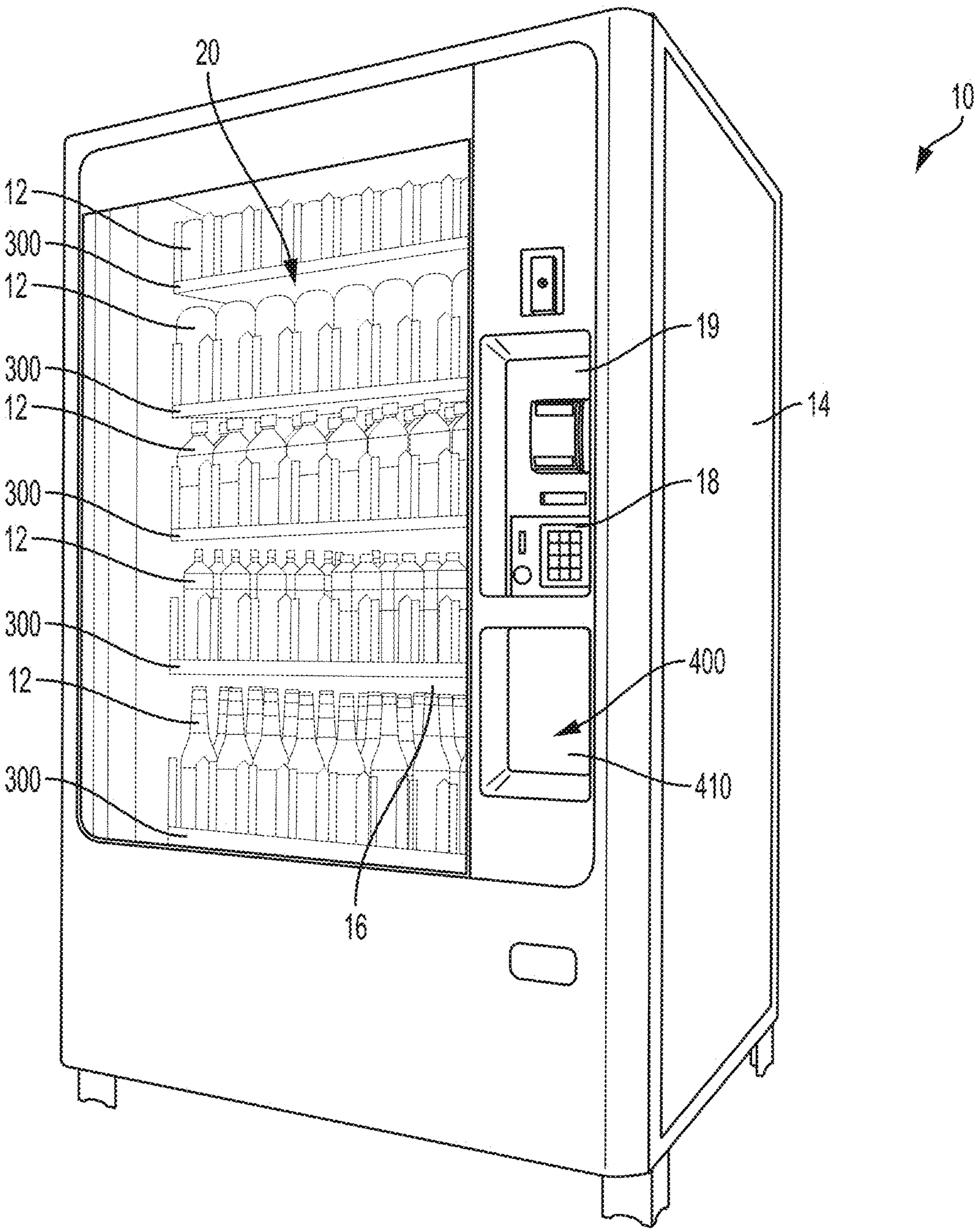
FIG. 1 shows a perspective view of a vending machine according to some embodiments.

The present invention(s) will now be described in detail with reference to embodiments thereof as illustrated in the accompanying drawings. References to “one embodiment”, “an embodiment”, “an exemplary embodiment”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Vending machines are used to store and deliver products (e.g., beverages in bottles, cans, boxes, etc.) to consumers. Conventional vending machines often deliver the products by dropping the products into a pick-up space where the consumer opens a hinged door, for example, to retrieve the product. However, seeing and/or hearing the product drop can be unpleasant for the consumer. In addition, dropping some products (e.g., carbonated drinks) may cause the product to be volatile when opened. Presenting the product to the consumer, rather than dropping the product, would improve the quality of the product and result in a better user experience.

While some vending machines do not drop products, these vending machines require high levels of service and maintenance. Thus, it is desirable to provide a vending machine that presents the product to the consumer but reduces the complexity of other vending machines (i.e., a lean vending machine). Furthermore, it is desirable for the vending machine to accommodate products of a variety of shapes (e.g., cylindrical, square) and sizes, while also providing simple product loading.

Accordingly, in some embodiments, a lean vending machine comprises a storage system, a delivery system, and a delivery area. These components interact with each other to dispense, transport, and present vending products to consumers without any dropping. In some embodiments, the interactions are primarily mechanical, thus reducing the complexity of the vending machine and reducing the need for service and maintenance.

In some embodiments, the storage system is modular. In some embodiments, the storage system comprises one or more shelves. In some embodiments, the plurality of shelves forms a grid of product storage areas. In some embodiments, each shelf is configured to dispense vending products. For example, each shelf may include a mechanism to dispense vending products, such as a spring-loaded product pusher. As another example, each shelf may be angled downward so that gravity assists and/or pulls vending products out of the shelf. In some embodiments, each shelf is flat. In some embodiments, each shelf comprises a gate that keeps the vending products on the shelf until the vending machine is ready to dispense the vending product.

In some embodiments, the delivery system comprises an X-Y mechanism and a delivery cup. In some embodiments, the X-Y mechanism moves the delivery cup in an X-direction and a Y-direction, allowing the delivery cup to be positioned next to a shelf to receive a vending product and then relocated to the delivery area to present the vending product to the consumer. In some embodiments, the X-Y mechanism includes lead screws and nut assemblies.

In some embodiments, the delivery cup is coupled to the X-Y mechanism and comprises a platform for supporting the vending product. In some embodiments, the delivery cup communicates with the shelf. In some embodiments, the delivery cup communicates with the shelf to properly locate the delivery cup. In some embodiments, the delivery cup interacts with the shelf to open the gate, allowing for one of the vending products to be dispensed onto or into the delivery cup. For example, the delivery cup may include an actuator to open the gate. In some embodiments, the delivery cup opens the gate by use of a solenoid activating a plunger.

In some embodiments, the delivery area comprises a retrieval location for the consumer to retrieve the vending product. In some embodiments, the delivery area comprises an outer door that isolates the delivery area from outside the vending machine. In some embodiments, the delivery cup mechanically interacts with the delivery area as the delivery cup enters the delivery area to provide the consumer with access to the vending product, thus presenting the vending product to the consumer. In some embodiments, the mechanical interaction rotates the delivery cup, opens an inner door, unlocks an inner door, and/or opens an outer door of the delivery area. In some embodiments, the mechanical interaction comprises an interaction between a pinion gear and a rack. In some embodiments, the mechanical interaction comprises an interaction between a pushing surface and a projection protruding through a slot. In some embodiments, the mechanical interaction comprises an interaction between a projection and a locking mechanism. In some embodiments, the mechanical interaction comprises a force directly on the inner door.

The vending products may include drinks, such as bottled water, energy drinks, carbonated soft drinks, milks, juices, sports drinks, etc., as well as food, such as chips, granola bars, energy bars, sandwiches, ice cream bars, candy, and other snacks. The vending products may be packaged in different sizes, shapes, and styles. Thus, while beverages are primarily discussed herein, the principles disclosed apply to other types of vending products as well. The lean vending machines disclosed herein may be used in any setting (e.g., school campuses, stores, malls, offices, etc.).

These and other embodiments are discussed below with reference to the figures. However, those skilled in the art will readily appreciate that the detailed description given herein with respect to these figures is for explanatory purposes only and should not be construed as limiting.

In some embodiments, vending machine 10, as shown, for example, in FIG. 1, comprises an exterior body 14. Exterior body 14 may be made from a plurality of pieces (such as side panels, a rear panel, a front panel, a top panel, or a bottom panel) or may be structured by any method known in the art without departing from the invention. In some embodiments, vending machine 10 includes a front panel 16. In some embodiments, front panel 16 is transparent. In some embodiments, front panel 16 is glass (e.g., single- or double-paned). In some embodiments, front panel 16 is transparent plastic. In some embodiments, front panel 16 is sized and shaped to allow consumers to see vending products 12 stored within vending machine 10.

In some embodiments, vending machine 10 comprises a user interface 18. In some embodiments, user interface 18 comprises a keypad and/or a touch screen, which may be used, for example, to select a desired vending product 12 or enter information (such as a PIN). In some embodiments, user interface 18 comprises payment mechanisms. For example, user interface 18 may include one or more of a currency reception area (e.g., bill and/or coin slot), a card reader (e.g., for reading credit cards, debit cards, ID cards, etc. by swiping), and contactless payment mechanisms (e.g., mechanisms based on RFID, QR codes, NFC, Bluetooth, etc.). In some embodiments, user interface 18 comprises payment return mechanisms, such as a bill and/or a coin return. In some embodiments, user interface 18 is disposed adjacent to front panel 16. In some embodiments user interface 18 is surrounded by a plastic cover 19.

In some embodiments, vending machine 10 is used to vend one or more vending products 12. In some embodiments, vending products 12 may each be the same type of product (e.g., bottled water). In some embodiments, vending machine 10 may include a variety of vending products 12 (e.g., bottled water, different flavors of soft drinks, juices, etc.).

In some embodiments, vending machine 10 includes a storage space 20. For example, storage space 20 may be located within exterior body 14. In some embodiments storage space 20 comprises the space visible through front panel 16. In some embodiments, vending machine 10 stores vending products 12 within storage space 20. For example, vending machine 10 may store vending products 12 on a plurality of shelves 300 within storage space 20. In some embodiments, each shelf 300 may be dedicated to a particular type of vending product 12.

In some embodiments, vending machine 10 comprises a delivery area 400. In some embodiments, delivery area 400 is configured to present vending products 12 to consumers. In some embodiments, delivery area 400 is surrounded by plastic cover 19. In some embodiments, delivery area 400 is disposed adjacent to (e.g., below) user interface 18. In some embodiments, delivery area 400 comprises an outer door 410. When closed, outer door 410 may isolate delivery area 400 from outside vending machine 10.

Figure 2:
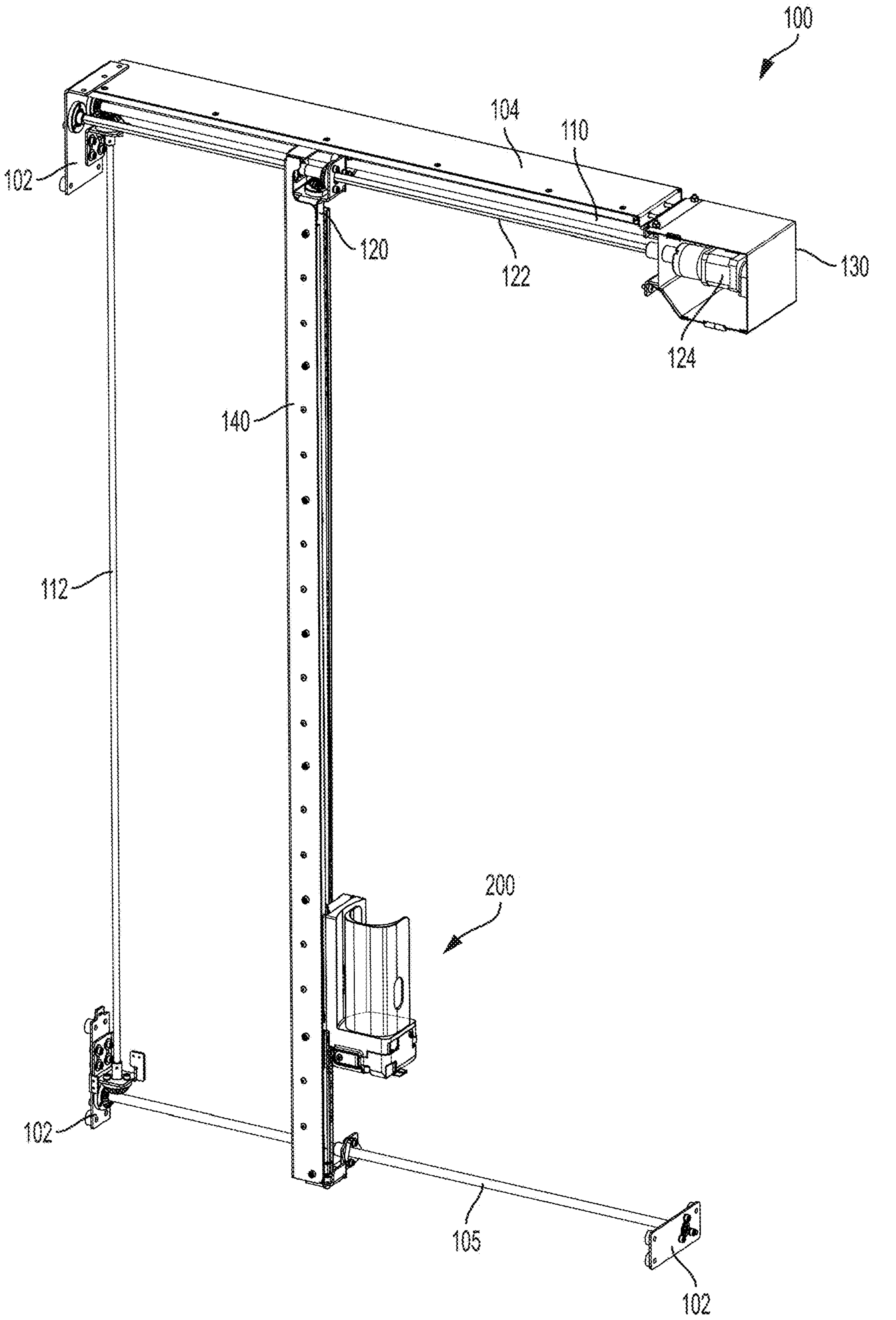
FIG. 2 shows a perspective view of a delivery system for a vending machine according to some embodiments.

In some embodiments, as shown, for example, in FIG. 2, vending machine 10 comprises a delivery system 100 to transport vending products 12 from shelves 300 to delivery area 400. In some embodiments, delivery system 100 is disposed between front panel 16 and shelves 300. In some embodiments, delivery system 100 comprises an X-Y mechanism and a delivery cup 200. In some embodiments, the X-Y mechanism of delivery system 100 is configured to move delivery cup 200 to any position in its plane within storage space 20, thus allowing delivery cup 200 to be positioned adjacent to any of the plurality of shelves 300 and to be positioned in delivery area 400.

In some embodiments, the X-Y mechanism of delivery system 100 is attached to vending machine 10 via supporting brackets 102. In some embodiments, supporting brackets 102 may be disposed in the corners of the X-Y mechanism. In some embodiments, the X-Y mechanism comprises supporting bar 104, which provides additional support to secure the X-Y mechanism within vending machine 10. In some embodiments, supporting bar 104 may be disposed near the top of vending machine 10.

In some embodiments, the X-Y mechanism of delivery system 100 comprises a system of lead screws and nut assemblies. In some embodiments, a nut assembly comprises a component (e.g., a bracket) that attaches a lead screw to the element that will be moved along the lead screw (e.g., delivery cup 200, another lead screw, etc.). The component may be threaded on an interior portion so that as the lead screw rotates, the component moves along the lead screw.

In some embodiments, the X-Y mechanism comprises a bottom horizontal lead screw 105, a top horizontal lead screw 110, and a vertical lead screw 120. In some embodiments, bottom horizontal lead screw 105 is disposed near the bottom of vending machine 10. In some embodiments, bottom horizontal lead screw 105 is disposed below the bottom of front panel 16 to be out of the consumer's sight. In some embodiments, top horizontal lead screw 110 is disposed near the top of vending machine 10. In some embodiments, top horizontal lead screw 110 is disposed above the top of front panel 16 to be out of the consumer's sight. In some embodiments, top horizontal lead screw 110 is coupled to and driven by a motor 114 (see FIG. 3). In some embodiments, motor 114 is disposed within a motor box 130. In some embodiments, motor 114 comprises a DC motor. In some embodiments, bottom horizontal lead screw 105 is also coupled to and driven by motor 114. In some embodiments, bottom horizontal lead screw 105 is coupled to motor 114 indirectly.

Figure 4:
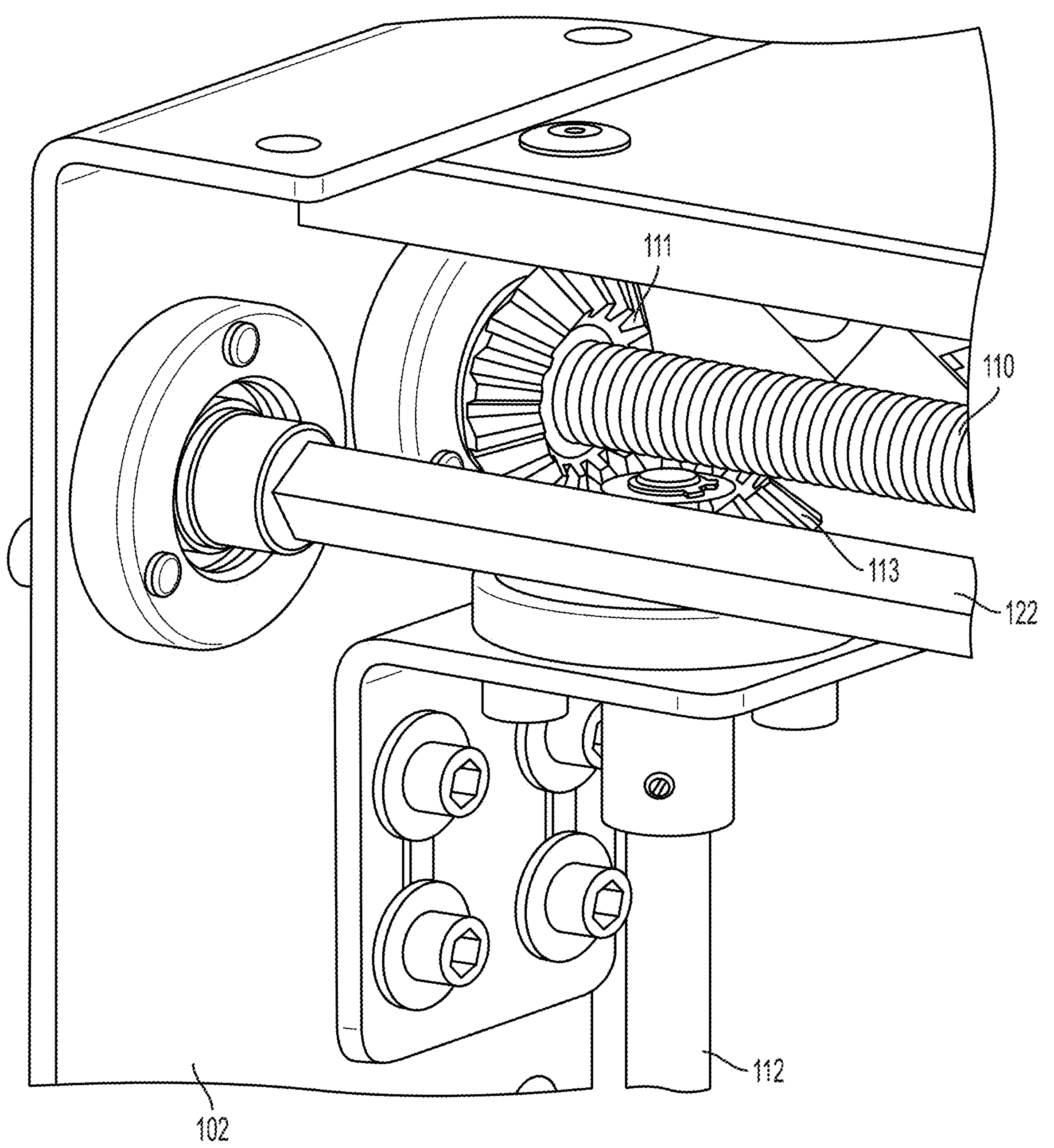
FIG. 4 shows a close-up view of a portion of a delivery system for a vending machine according to some embodiments.
Figure 6:
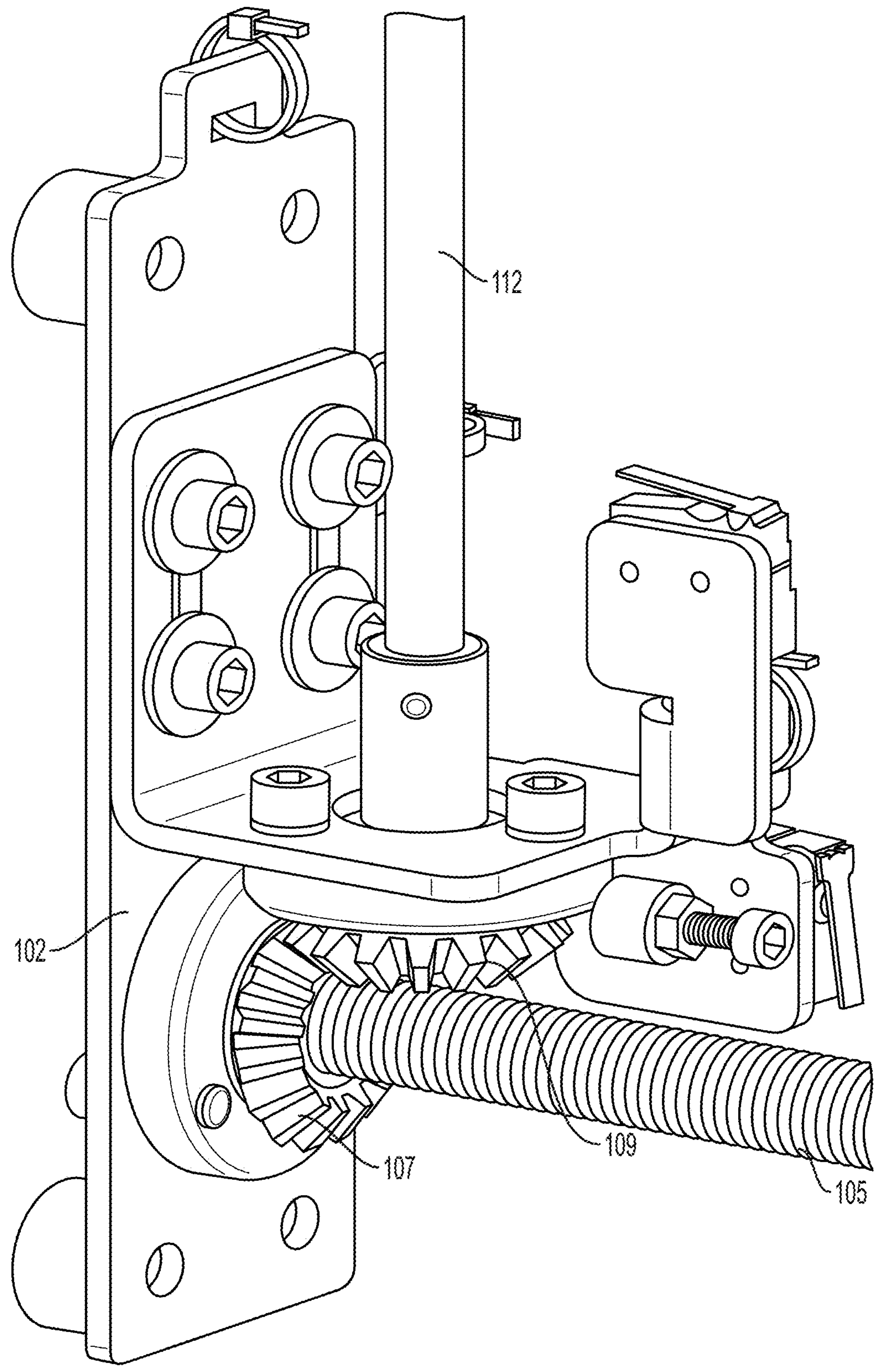
FIG. 6 shows a close-up view of a portion of a delivery system for a vending machine according to some embodiments.

In some embodiments, the motion of top horizontal lead screw 110 is transmitted to bottom horizontal lead screw 105 via a transmission bar 112. For example, as shown in FIG. 4, a transmission gear 111 may be coupled to top horizontal lead screw 110 and a transmission gear 113 may be coupled to transmission bar 112. Transmission gear 111 may engage transmission gear 113 so that when top horizontal lead screw 110 rotates, transmission bar 112 also rotates. As shown in FIG. 6, a transmission gear 109 may be coupled to transmission bar 112 and a transmission gear 107 may be coupled to bottom horizontal lead screw 105. Transmission gear 109 may engage transmission gear 107 so that when transmission bar 112 rotates, bottom horizontal lead screw 105 also rotates. In some embodiments, top horizontal lead screw 110 and bottom horizontal lead screw 105 rotate at the same speed. For example, the gear ratio between transmission gear 111 and transmission gear 113 may be 1:1 and the gear ratio between transmission gear 109 and transmission gear 107 may also be 1:1. In some embodiments, transmission bar 112 is disposed at a side of vending machine 10 opposite from delivery area 400. In some embodiments, transmission bar 112 is disposed to the left of front panel 16 to be out of the consumer's sight.

Figure 5:
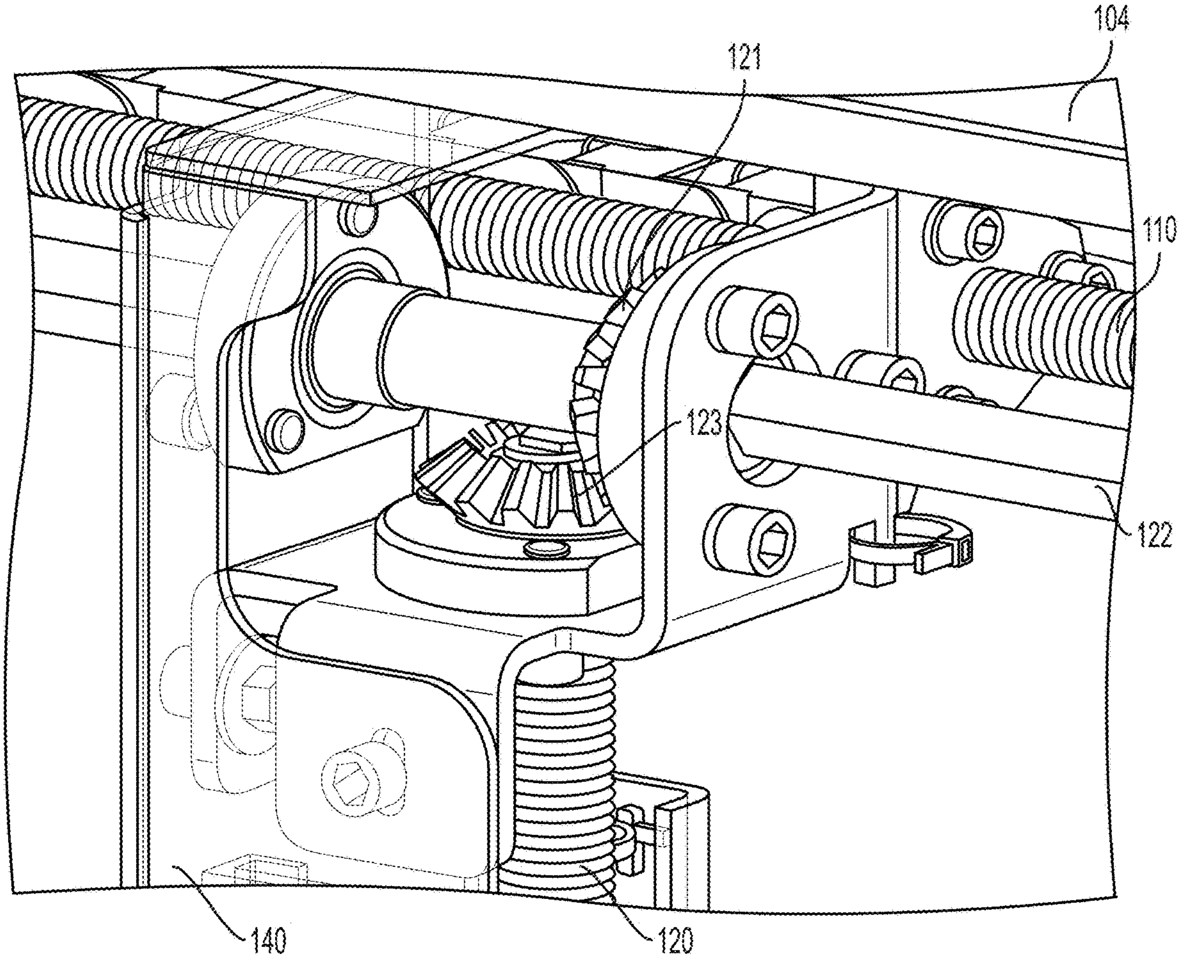
FIG. 5 shows a close-up view of a portion of a delivery system for a vending machine according to some embodiments.
Figure 7:
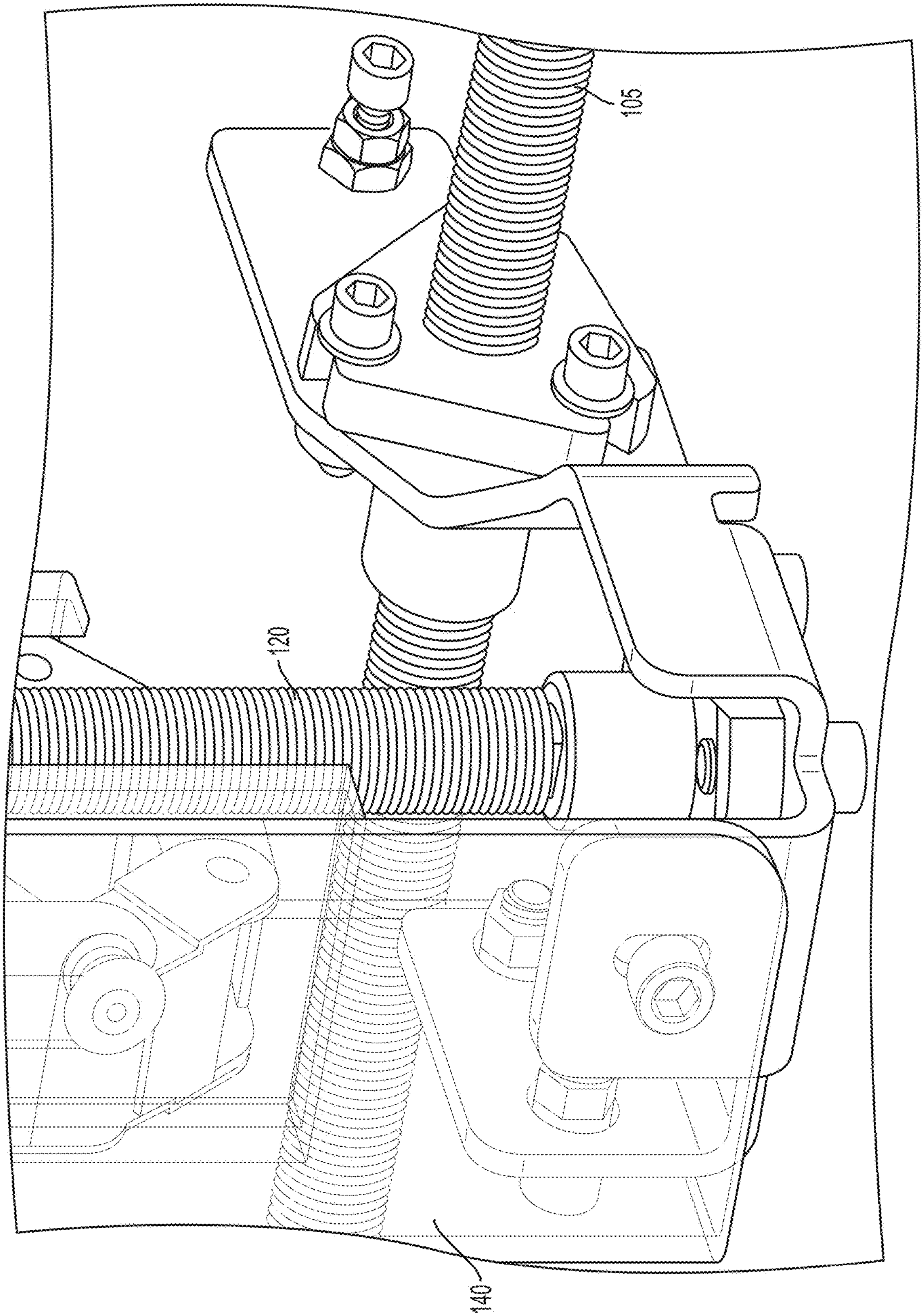
FIG. 7 shows a close-up view of a portion of a delivery system for a vending machine according to some embodiments.

In some embodiments, vertical lead screw 120 is coupled to top horizontal lead screw 110 and bottom horizontal lead screw 105, as shown, for example, in FIGS. 5 and 7, with a nut configuration such that vertical lead screw 120 moves along top horizontal lead screw 110 and bottom horizontal lead screw 105 as top horizontal lead screw 110 and bottom horizontal lead screw 105 rotate. In some embodiments, vertical lead screw 120 is coupled to a motor 124 (see FIGS. 2-3). In some embodiments, vertical lead screw 120 is coupled to motor 124 indirectly via a transmission bar 122. For example, as shown in FIG. 5, a transmission gear 121 may be coupled to transmission bar 122 and a transmission gear 123 may be coupled to vertical lead screw 120. Transmission gear 121 may engage transmission gear 123 so that when transmission bar 122 rotates, vertical lead screw 120 also rotates. In some embodiments, transmission bar 122 is disposed adjacent to top horizontal lead screw 110. Thus, in some embodiments, transmission bar 122 is disposed above the top of front panel 16 to be out of the consumer's sight. In some embodiments, transmission bar 122 is square.

Figure 3:
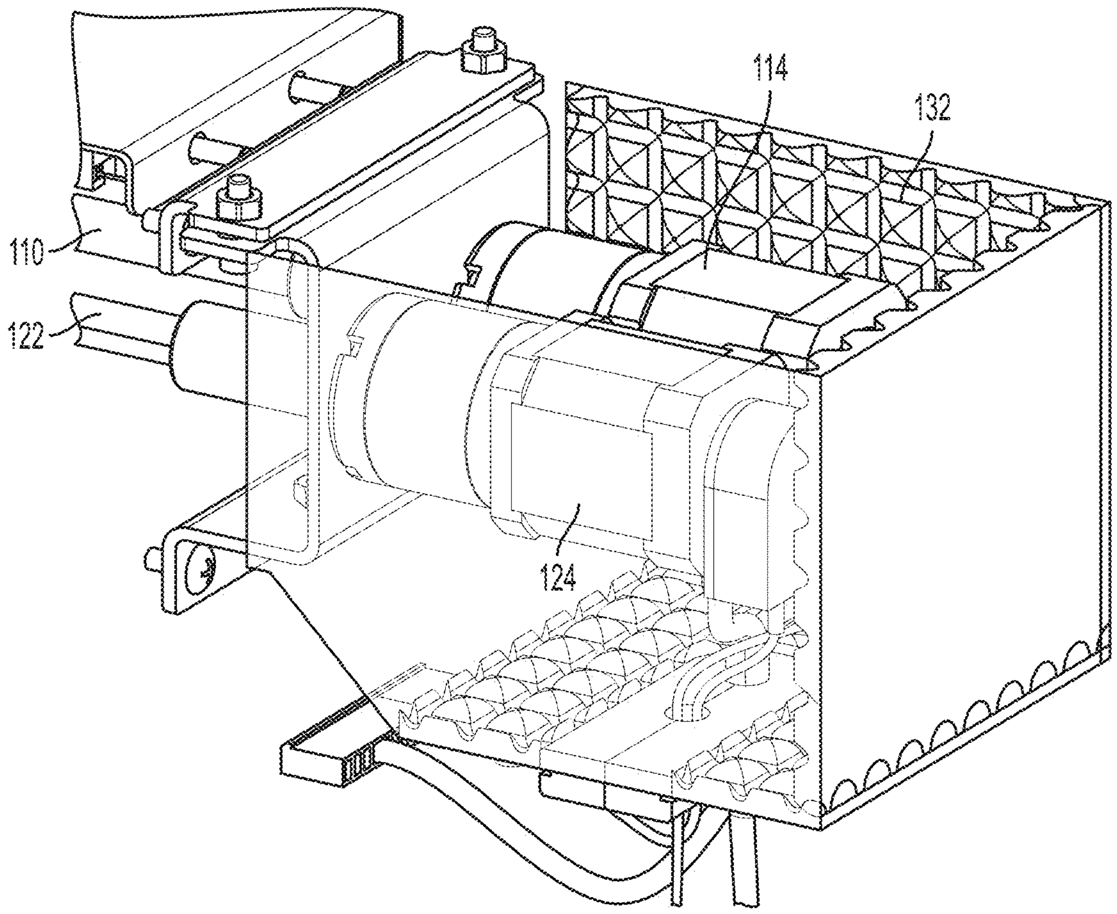
FIG. 3 shows a close-up view of a portion of a delivery system for a vending machine according to some embodiments.

In some embodiments, motor 124 is disposed adjacent to motor 114. In some embodiments, motor 124 is disposed within motor box 130. In some embodiments, motor 124 comprises a DC motor. In some embodiments, motor box 130 comprises insulation 132 as shown in FIG. 3 with motor box 130 removed. In some embodiments, insulation 132 may reduce the noise of motors 114 and 124 heard by consumers. In some embodiments, motor box 130 is disposed out of the consumer's sight. For example, motor box 130 may be disposed in an upper right corner (i.e., to the right and/or above the edges of front panel 16. Thus, in some embodiments, motor box 130 may be disposed outside of storage space 20. In some embodiments, motors 114 and 124 are controlled by a controller. For example, motors 114 and 124 may receive signals from the controller to move delivery cup 200 in a certain amount in the X-direction and a certain amount in the Y-direction. The signals from the controller may be based on a selection of a particular vending product 12 by the consumer via user interface 18. The controller may be a single controller that controls both motors 114 and 124 or it may be two separate controllers that separately control motors 114 and 124.

In some embodiments, a support beam 140 is coupled to vertical lead screw 120. In some embodiments, support beam 140 operates to provide additional structural support to vertical lead screw 120. In some embodiments, support beam 140 operates to conceal portions of the X-Y mechanism to be out of the consumer's sight (e.g., vertical lead screw 120, electrical connections, brackets, etc.).

Figure 8:
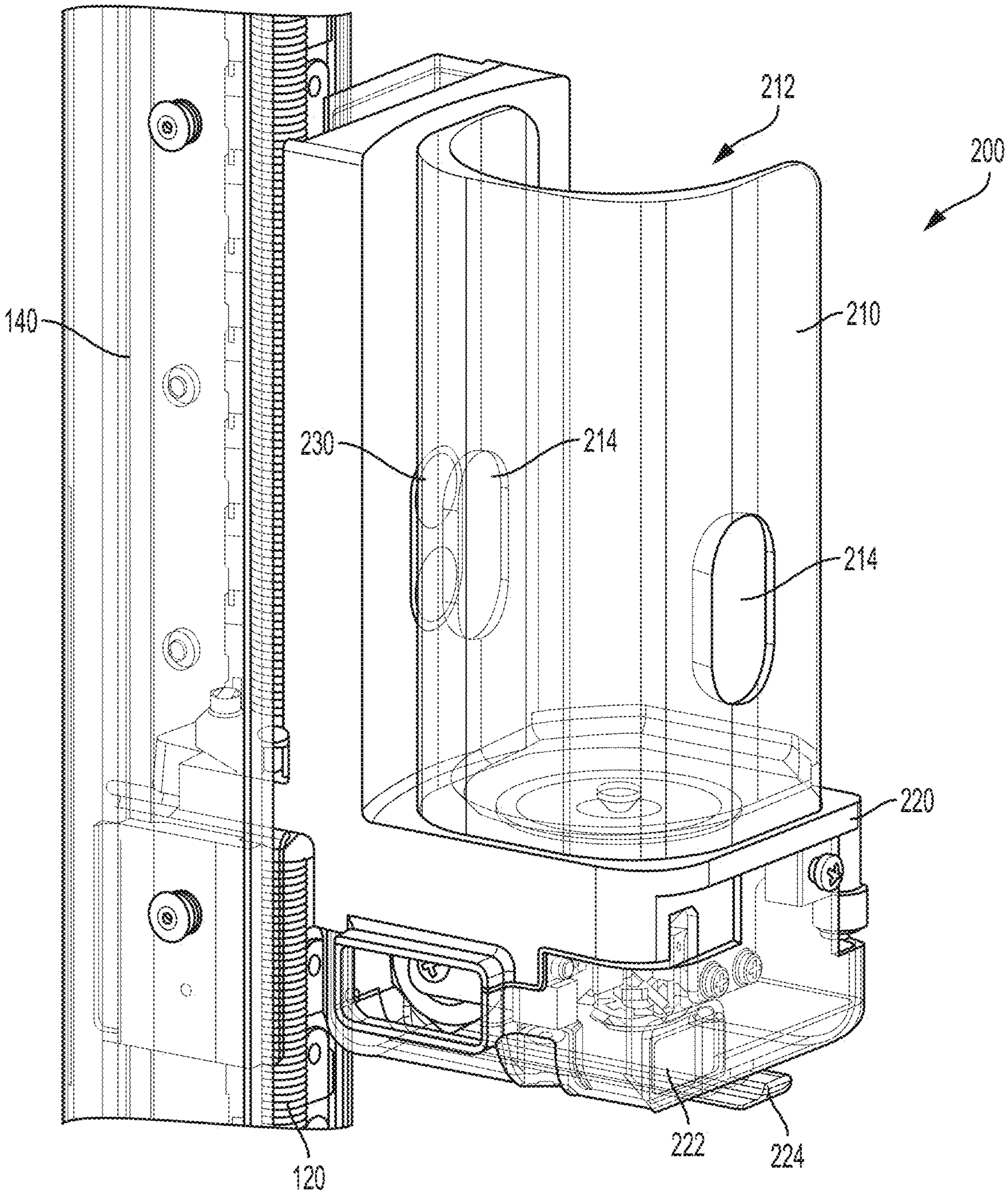
FIG. 8 shows a perspective view of a delivery cup for a vending machine according to some embodiments.

In some embodiments, delivery cup 200 of delivery system 100 is coupled to vertical lead screw 200, as shown, for example, in FIGS. 2 and 8, with a nut configuration such that delivery cup 200 moves along vertical lead screw 120 as vertical lead screw 120 rotates. Thus, delivery cup 200 may move in a Y-direction as vertical lead screw 120 rotates and in an X-direction (along with vertical lead screw 120 and support beam 140) as top horizontal lead screw 110 and bottom horizontal lead screw 105 rotate. Thus, delivery cup 200 can be precisely and reliably positioned at any of the shelves 300 and at delivery area 400 based on signals received by the controller that controls motors 114 and 124. In some embodiments, other types of X-Y mechanisms may be used instead of a system of lead screws and nut assemblies to precisely locate delivery cup 200.

In some embodiments, delivery cup 200 is configured to receive vending product 12 from shelves 300 and transport vending product 12 to delivery area 400. In some embodiments, delivery cup 200 is configured to interact with shelves 300. In some embodiments, delivery cup 200 may communicate with shelf 300 and vice versa. For example, shelf 300 may send a signal to delivery cup 200 indicating that delivery cup 200 has arrived at a proper location. As another example, delivery cup 200 may send a signal to shelf 300 that delivery cup 200 is ready to receive vending product 12. Signals between delivery cup 200 and shelf 300 may utilize, for example, RFID, NFC, or Bluetooth technologies. In some embodiments, delivery cup 200 may include an actuator that causes shelf 300 to dispense vending product 12. In some embodiments, the actuator comprises a mechanical actuator.

In some embodiments, delivery cup 200 is configured to interact with delivery area 400. In some embodiments, the interaction between delivery cup 200 and delivery area 400 allows a consumer to easily access vending product 12 within delivery area 400. In some embodiments, the interaction between delivery cup 200 and delivery area 400 opens outer door 410. In some embodiments, delivery cup 200 is configured to mechanically interact with delivery area 400. In some embodiments, the mechanical interaction between delivery cup 200 and delivery area 400 causes outer door 410 to open. In some embodiments, the mechanical interaction between delivery cup 200 and delivery area 400 results in movement of other components of delivery area 400 and/or delivery cup 200 that provides the consumer with better access to vending product 12. In some embodiments, the mechanical interaction between delivery cup 200 and delivery area 400 effectively presents vending product 12 to the consumer.

Figure 9:
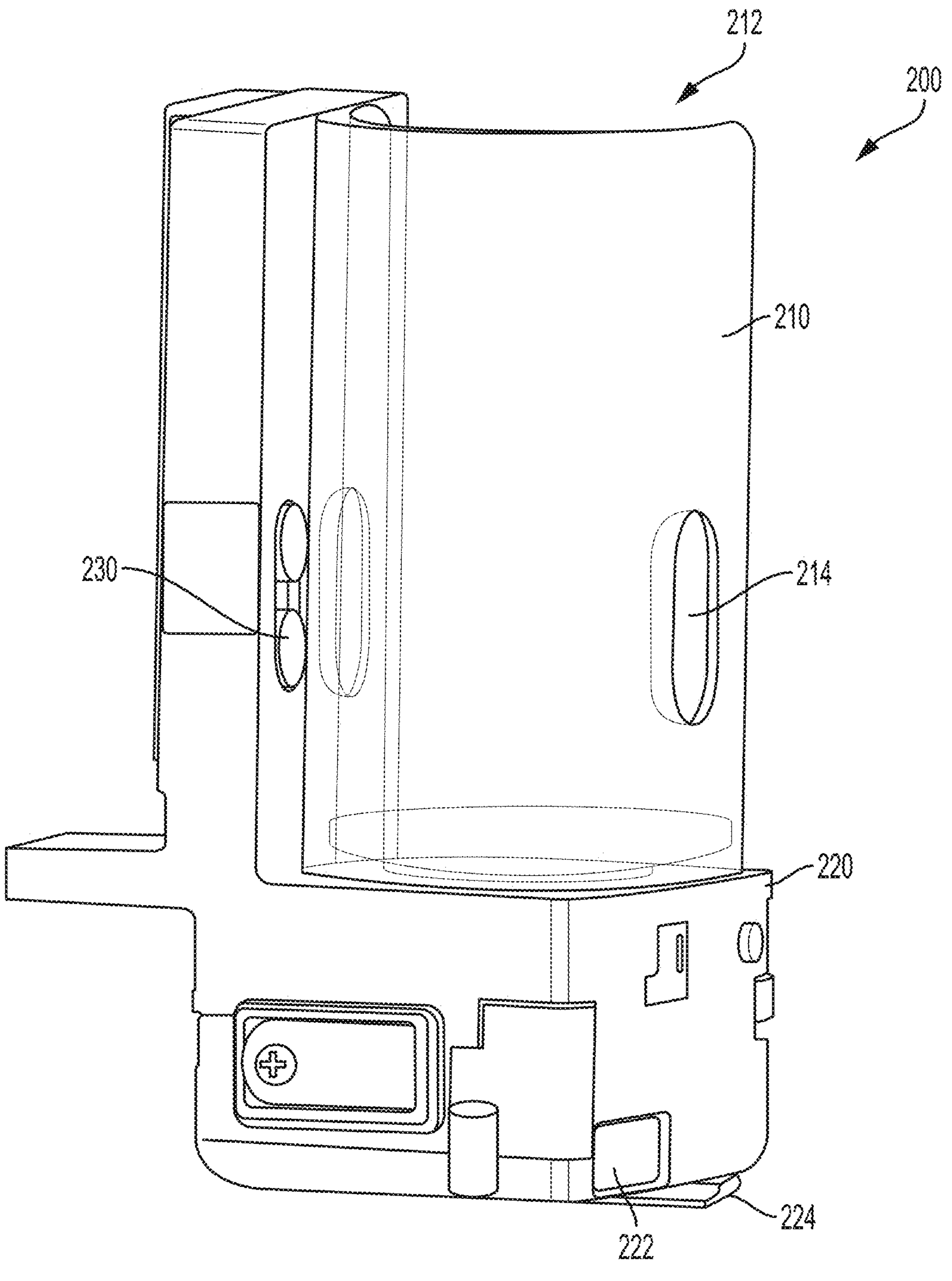
FIG. 9 shows a perspective view of a delivery cup for a vending machine according to some embodiments.
Figure 10:
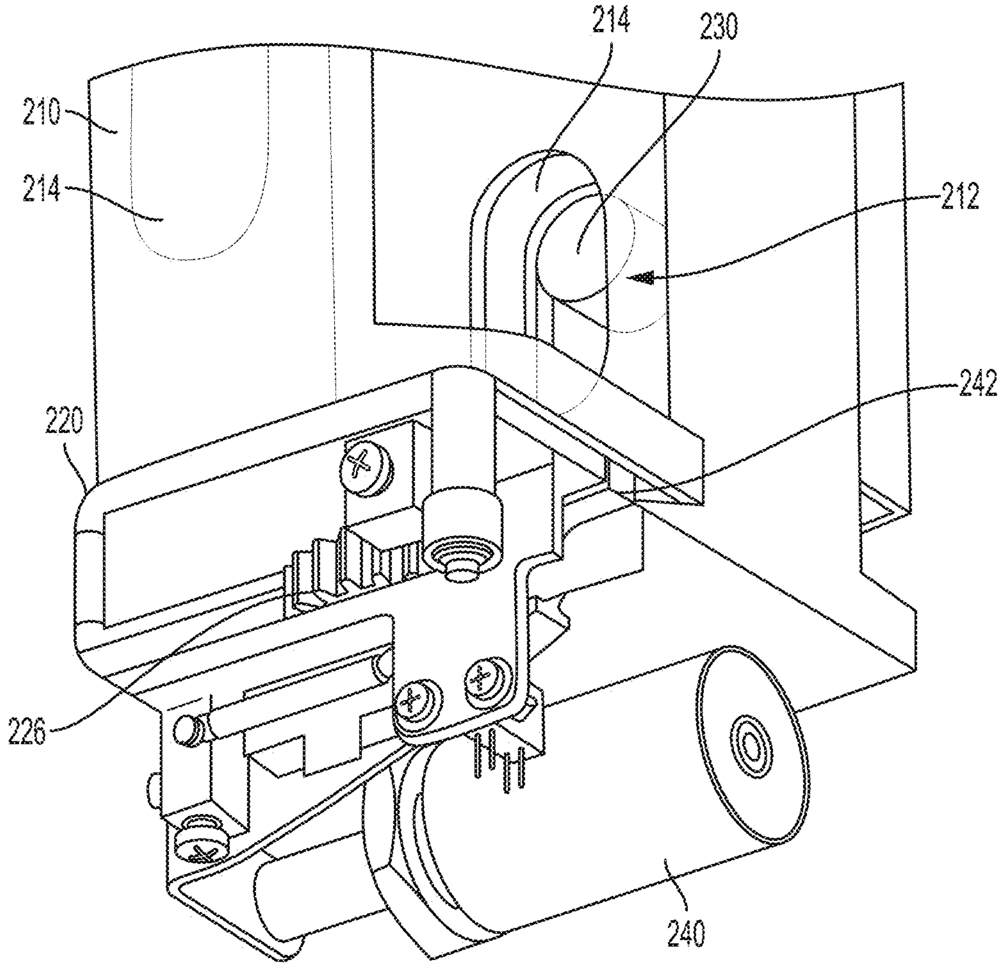
FIG. 10 shows an interior view of a portion of a delivery cup for a vending machine according to some embodiments.

In some embodiments, as shown, for example, in FIGS. 8-10, delivery cup 200 comprises a receptacle 210 and a platform 220. In some embodiments, receptacle 210 is transparent, allowing consumers to see vending product 12 as it is transported to delivery area 400. In some embodiments, receptacle 210 has an open side 212. In some embodiments, open side 212 is configured to face shelves 300. In some embodiments, receptacle 210 is configured to rotate relative to platform 220. For example, as described more fully below, receptacle 210 may rotate 180 degrees as it enters delivery area 400 so that open side 212 faces towards the consumer, thus facilitating the consumer's access to vending product 12.

In some embodiments, platform 220 supports receptacle 210. In some embodiments, platform 220 comprises features that facilitate the consumer's access to vending product 12. These features may include a pushing surface 222, a projection 224, and/or a pinion gear 226 (see FIG. 10). In some embodiments, pushing surface 222 may open outer door 410, as described more fully below. In some embodiments, projection 224 may unlock an inner door 420 of delivery area 400, as described more fully below. In some embodiments, pinion gear 226 may interact with a rack 430 of delivery area 400 to rotate receptacle 210, as described more fully below. Thus, in some embodiments, pinion gear 226 is coupled to receptacle 210 so that the rotation of pinion gear 226 is tied to the rotation of receptacle 210.

In some embodiments, delivery cup 200 comprises a sensor 230 to sense whether vending product 12 is within delivery cup 200 (i.e., sensor 230 can sense the presence or absence of vending product 12 within delivery cup 200). In some embodiments, sensor 230 comprises an ultrasound sensor. In some embodiments, receptacle 210 comprises holes 214 to facilitate sensing of vending product 12 by sensor 230. In some embodiments, receptacle 210 comprises two holes 214 on opposite sides so that sensor 230 can sense when vending product 12 is received from shelf 300 (i.e., before rotating 180 degrees) and can sense when vending product 12 is removed by the consumer in delivery area 400 (i.e., after rotating 180 degrees).

In some embodiments, movements of delivery cup 200 may be based on sensor 230 sensing vending product 12 (or the absence thereof). For example, delivery cup 200 may stay in delivery area 400 until it senses the absence of vending product 12 (indicating that the consumer has retrieved vending product 12). As another example, delivery cup 200 may stay by shelf 300 until it senses vending product 12 (indicating that vending product 12 is ready to be transported to delivery area 400). In some embodiments, different types of sensors may be used, in the same or in different locations, in place of sensor 230. For example, a pressure sensor may be used to sense the presence of vending product 12 by the weight of receptacle 210 and anything therein.

In some embodiments, delivery cup 200 comprises features that facilitate the dispensing of vending product 12 from shelves 300. For example, as discussed above, delivery cup 200 and shelf 300 may send signals to communicate that delivery cup 200 is properly positioned relative to shelf 300. In some embodiments, delivery cup 200 may comprise an actuator. In some embodiments, the actuator may send a signal for shelf 300 to dispense vending product 12. In some embodiments, the signal may be sent via RFID, NFC, or Bluetooth technologies. In some embodiments, the actuator may comprise a mechanical actuator. In some embodiments, the actuator comprises a solenoid 240 and a plunger 242, as shown, for example, in FIG. 10. In some embodiments, solenoid 240 activates plunger 242. In some embodiments, when plunger 242 is activated, plunger 242 interacts with shelf 300, as described more fully below, to allow shelf 300 to dispense one vending product 12 into delivery cup 200. In some embodiments, solenoid 240 activates plunger 242 for a timed pulse.

Figure 11:
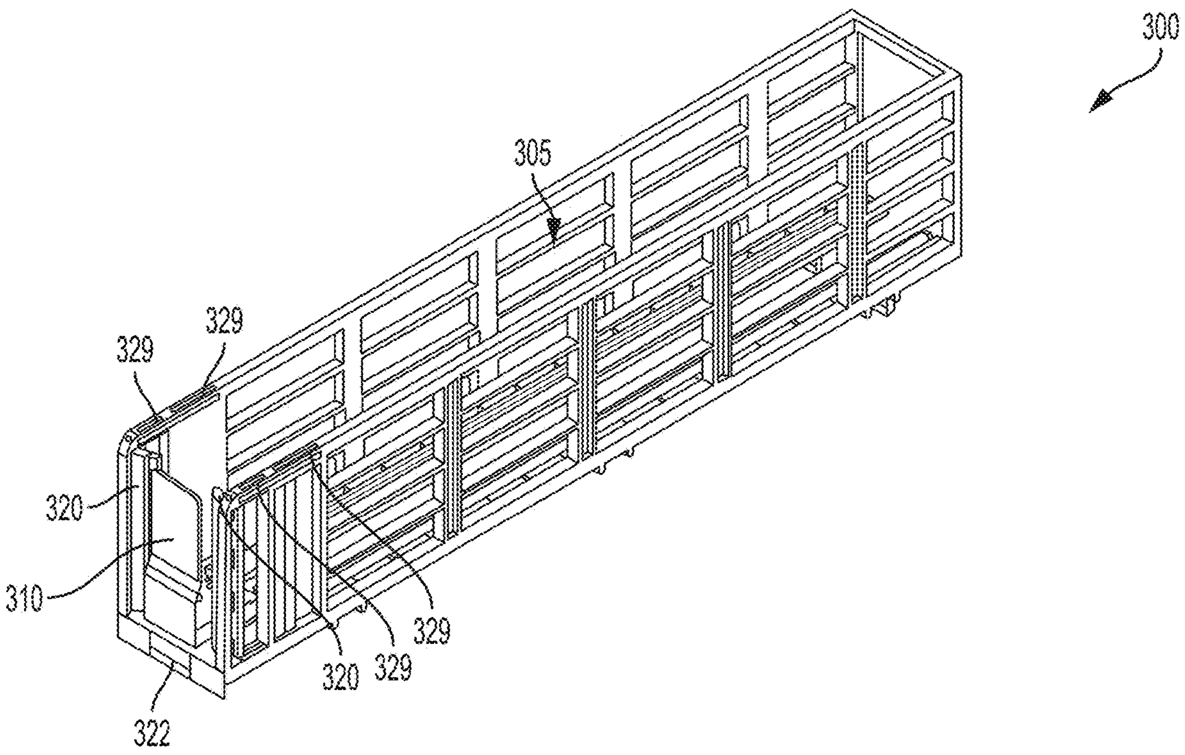
FIG. 11 shows a perspective view of a shelf for a vending machine according to some embodiments.

In some embodiments, as shown, for example, in FIG. 11, shelf 300 comprises a product storage area 305, a product pusher 310, and a gate 320. While FIG. 11 only shows one shelf 300, vending machine 10 may contain a plurality of shelves 300. In some embodiments, shelves 300 are modular. In some embodiments, shelves 300 may be positioned in a grid (i.e., adjacent shelves 300 in a row and multiple rows of shelves 300 arranged vertically). In some embodiments, product storage area 305 is configured to receive a variety of vending products 12 having different shapes and sizes. In some embodiments, vending products 12 are loaded into product storage area 305 by pushing vending products against product pusher 310 and through gate 320.

Figure 12:
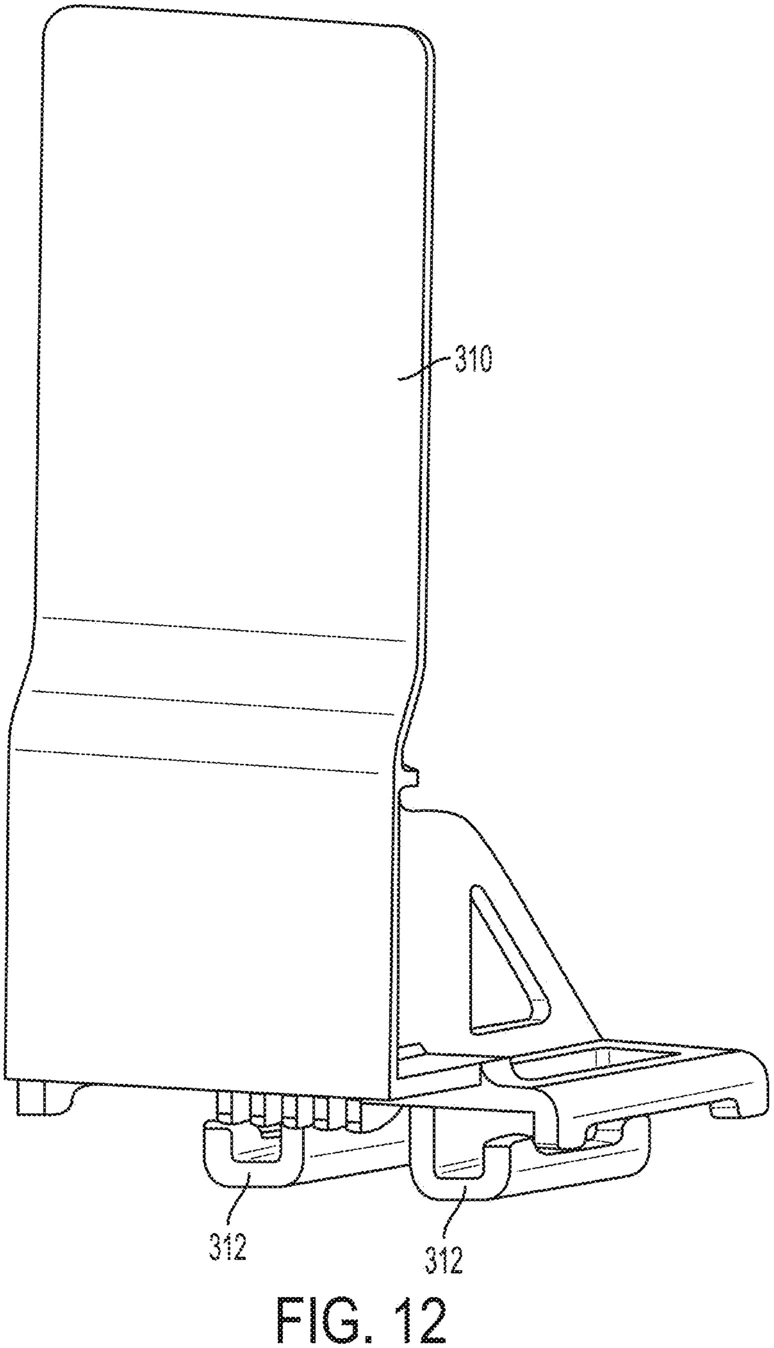
FIG. 12 shows a perspective view of a product pusher for a vending machine according to some embodiments.
Figure 13:
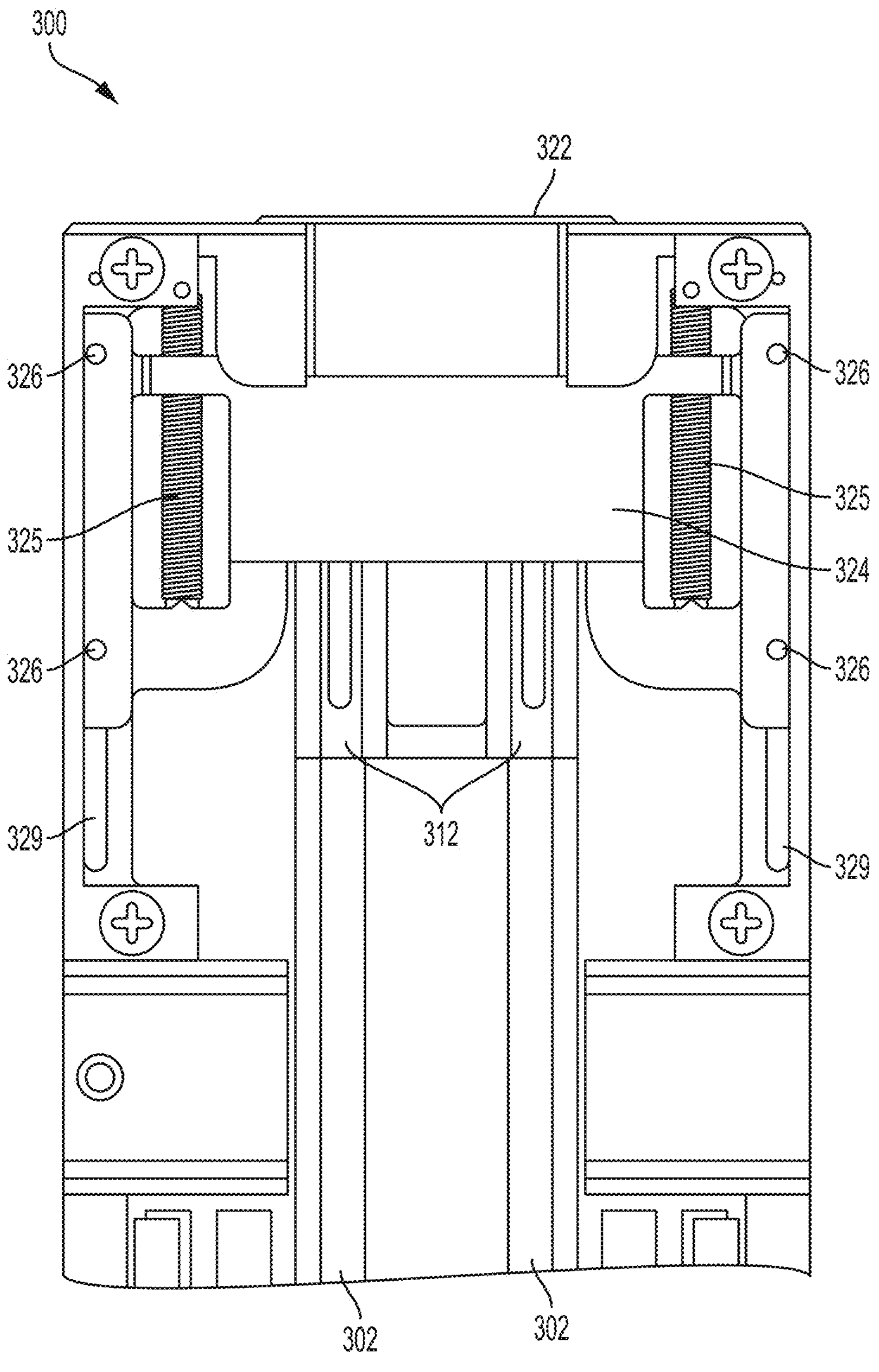
FIG. 13 shows a bottom view of a shelf for a vending machine according to some embodiments.
Figure 14:
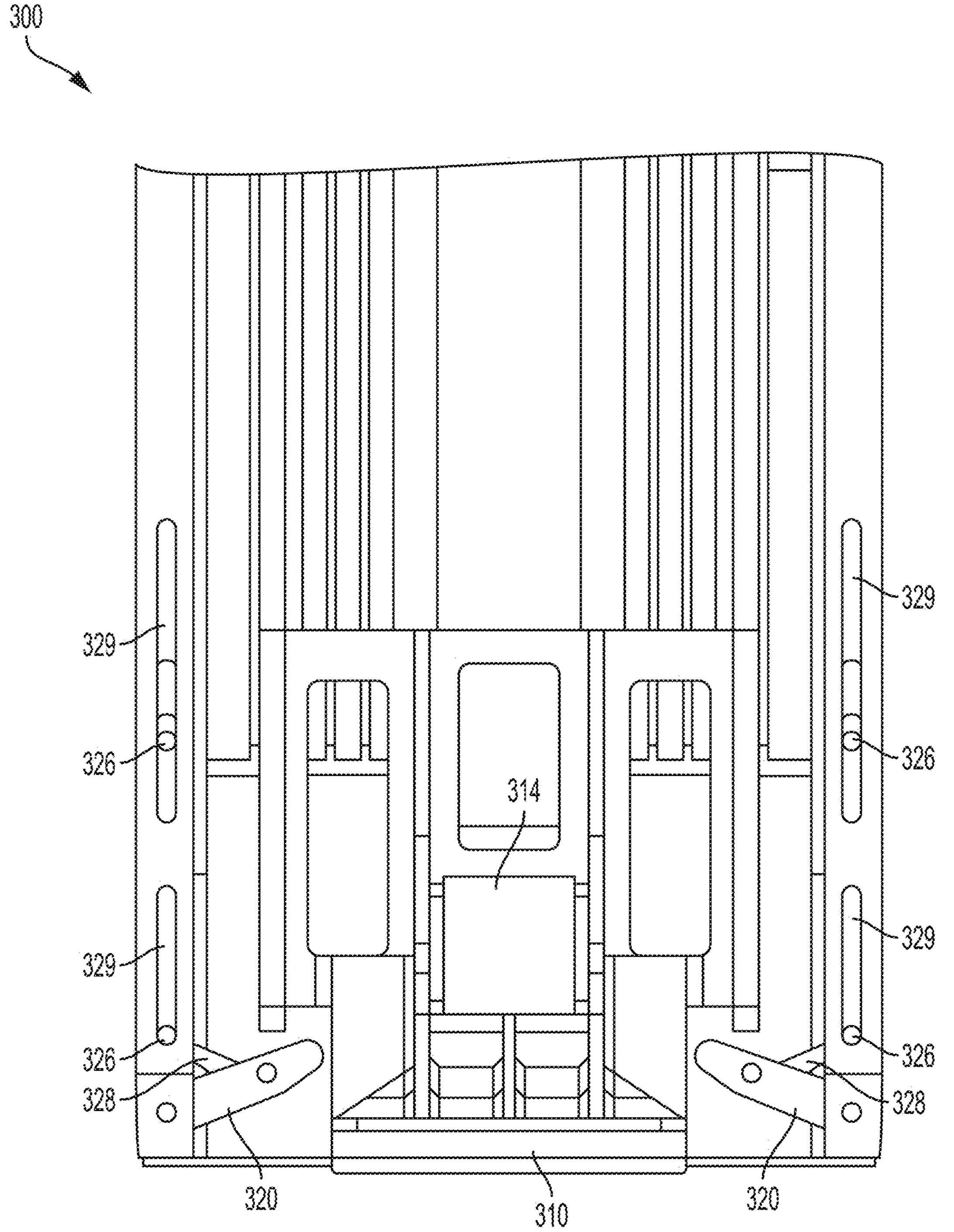
FIG. 14 shows a top view of a shelf for a vending machine according to some embodiments.
Figure 15:
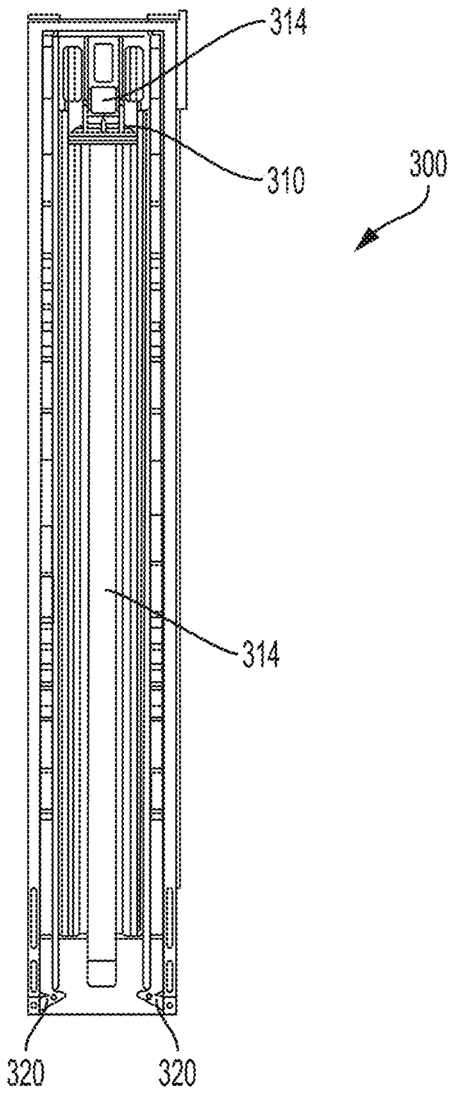
FIG. 15 shows a top view of a shelf for a vending machine according to some embodiments.
Figure 16:
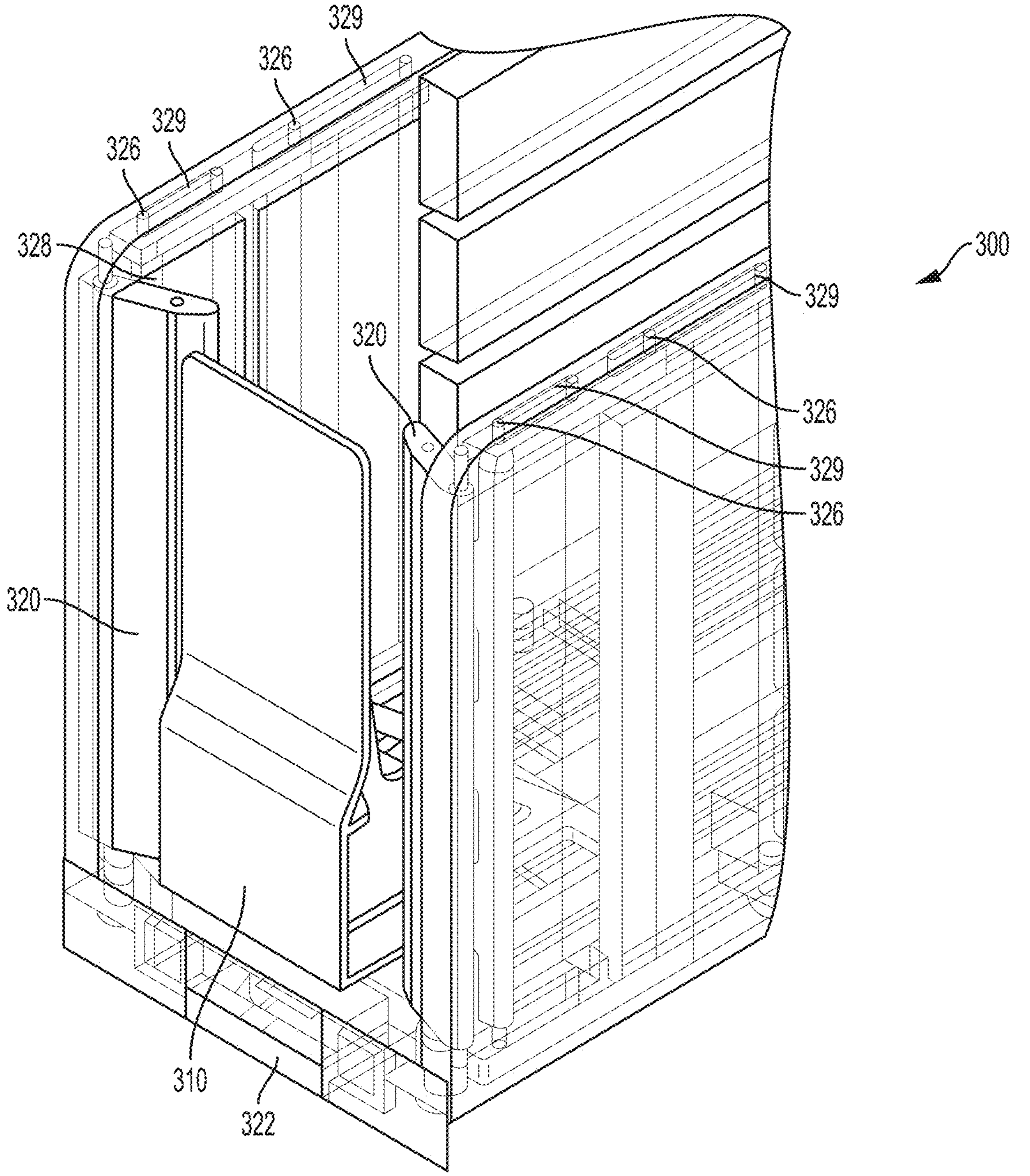
FIG. 16 shows a perspective view of a shelf for a vending machine according to some embodiments.

In some embodiments, product pusher 310 is configured to slide along shelf 300 via sliding members 312, as shown, for example, in FIG. 12. In some embodiments, as shown, for example, in FIG. 13, sliding members 312 may slide along rails 302 of shelf 300. As shown in FIG. 12, product pusher 310 may be biased to a front portion of shelf 300. When vending products 12 are inserted into product storage area 305, product pusher 310 is pushed towards the back of shelf 300. In some embodiments, product pusher 310 is spring-loaded, thus tending to push vending product 12 out of product storage area 305. For example, product pusher 310 may be biased to a front portion of shelf 300 with spring 314 (see FIGS. 14-15). In some embodiments, spring 314 comprises a constant force spring. When product pusher 310 is at the front of shelf 300, spring 314 may be entirely rolled up. As vending products 12 are inserted into product storage area 305, product pusher 310 is pushed back, thus unrolling spring 314. Unrolled spring 314 exerts a force on product pusher 310, which pushes on vending products 12. In some embodiments, shelf 300 is flat or horizontal, for example, shelf 300 may be parallel relative to the floor or to a base vending machine 10. In some embodiments, shelf 300 is angled down toward delivery cup 200 (i.e., toward the front of vending machine 10). Thus, gravity may also exert a force on vending products 12 to move them out of product storage area 305.

In some embodiments, gate 320 operates to hold vending products 12 within product storage area 305. In some embodiments, gate 320 comprises two side gates 320 (see FIGS. 11, 14-16). Gates 320 may be sized based on the smallest vending product 12 to be stored in vending machine 10. Thus, gates 320 may hold any size vending product 12 within product storage area 305. In some embodiments, two side gates 320 are disposed at a side of shelf 300. For example, one side gate 320 may be disposed on each side of shelf 300. In some embodiments, two side gates 320 extend only partially inward from each side of shelf 300. In some embodiments, shelf 300 comprises a sensor, such as an optical sensor, to determine the size of vending product 12 within product storage area 305.

In some embodiments, gates 320 are hinged. In some embodiments, gates 320 are spring-loaded into a closed position. For example, springs 325, as shown, for example, in FIG. 13, may be included with shelf 300 to keep gates 320 in a closed position. In some embodiments, gates 320 are mechanically linked to front plate 322, bottom plate 324, and side rods 326 (see FIGS. 13 and 16). In some embodiments, front plate 322 is disposed at the bottom of the front side of shelf 300 facing delivery cup 200. In some embodiments, front plate 322 is configured to be pushed into shelf 300. In some embodiments, plunger 242 of delivery cup 200 is configured to push front plate 322 into shelf 300. In some embodiments, as front plate 322 is pushed in, bottom plate 324 and side rods 326 are also pushed back. In some embodiments, side rods 326 slide within slots 329. In some embodiments, a link 328 connects side rods 326 with gate 320. Accordingly, as side rods 326 slide back within slot 329, link 328 is pulled back, thus swinging gate 320 open.

In some embodiments, as soon as front plate 322 is released, front plate 322 returns to its original position due to the force exerted by springs 325. In some embodiments, gates 320 stay open only long enough for one vending product 12 to be dispensed from shelf 300. In some embodiments, the timed pulse of solenoid 240 is long enough to allow one vending product 12 to dispense from shelf 300. In some embodiments, the length of time of the timed pulse is varied and may be based on the size of vending product 12. In some embodiments, the length of time of the timed pulse is the same for each vending product 12, regardless of size. In some embodiments, the timed pulse is less than one second (e.g., 0.2-0.5 seconds). In some embodiments, shelf 300 comprises an optical sensor configured to sense when gates 320 are entirely open. In some embodiments, the optical sensor is configured to send a signal to solenoid 240. In some embodiments, the timed pulse begins when solenoid 240 receives a signal that gates 320 are entirely open. Similar timing or timed pulses may occur in embodiments where the actuator is not a solenoid and plunger configuration.

Figure 17:
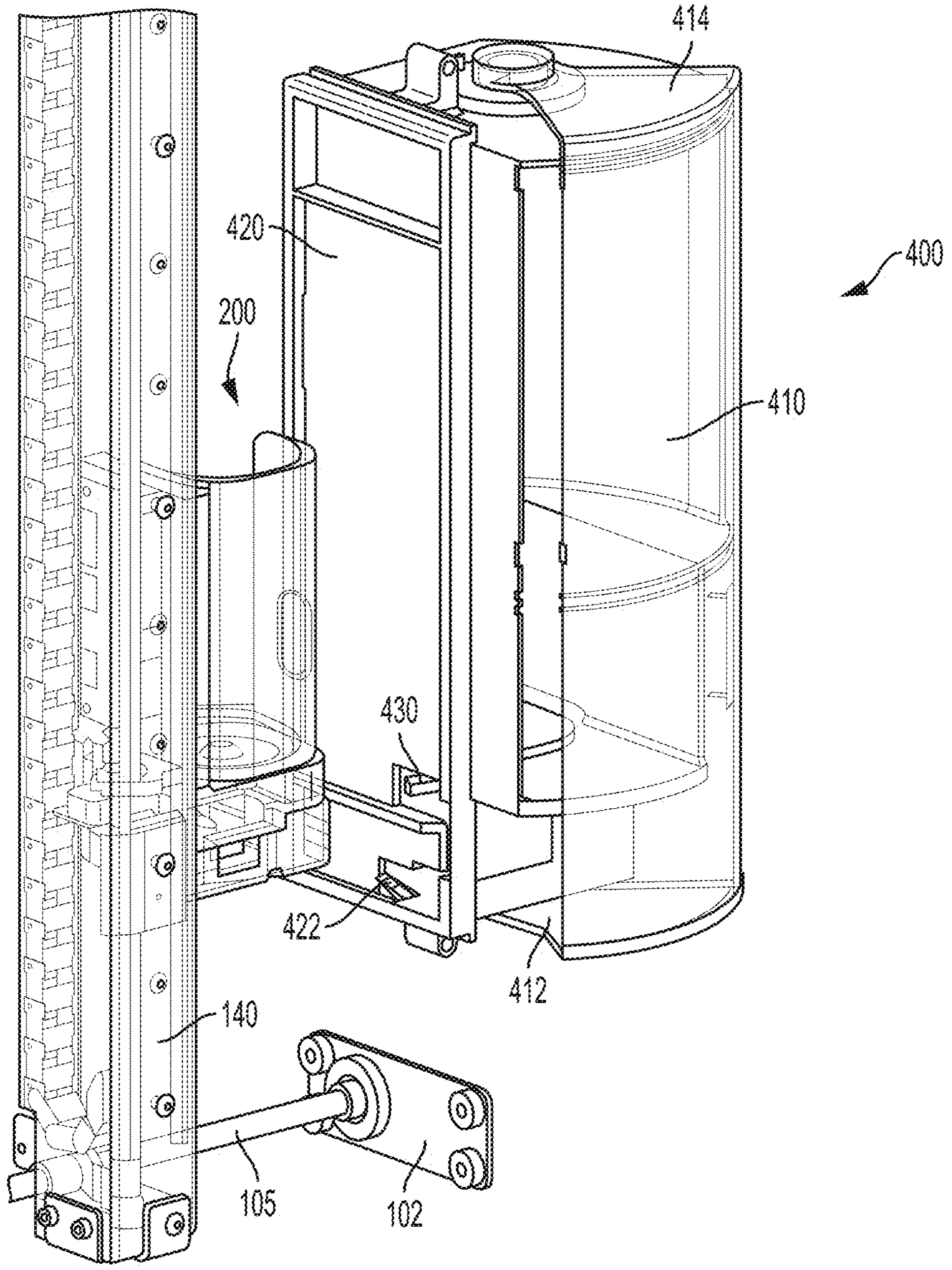
FIG. 17 shows a perspective view of a delivery area for a vending machine according to some embodiments.

In some embodiments, after delivery cup 200 receives vending product 12 from shelf 300, delivery cup 200 transports vending product 12 to delivery area 400. In some embodiments, delivery area 400 comprises the area where consumers may retrieve vending product 12. In some embodiments, as shown, for example, in FIG. 17, delivery area 400 comprises outer door 410 and inner door 420.

Figure 18A:
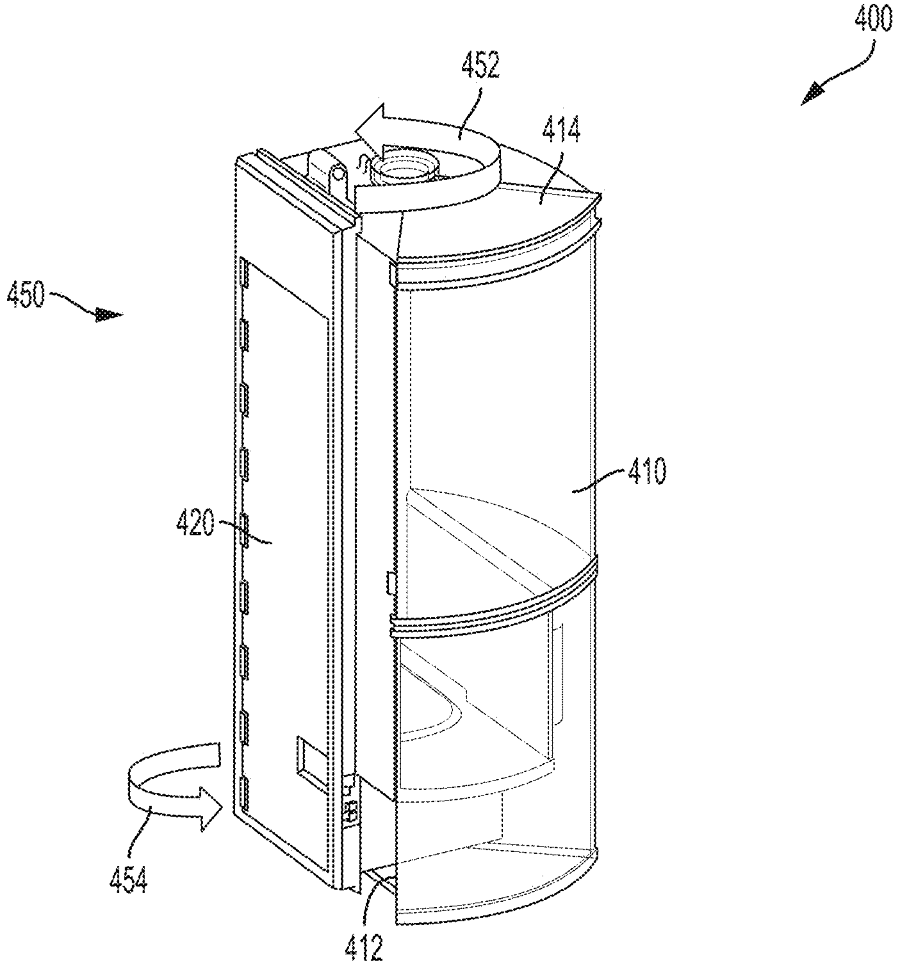
FIG. 18A shows a perspective view of a delivery area for a vending machine in a closed configuration according to some embodiments.
Figure 18B:
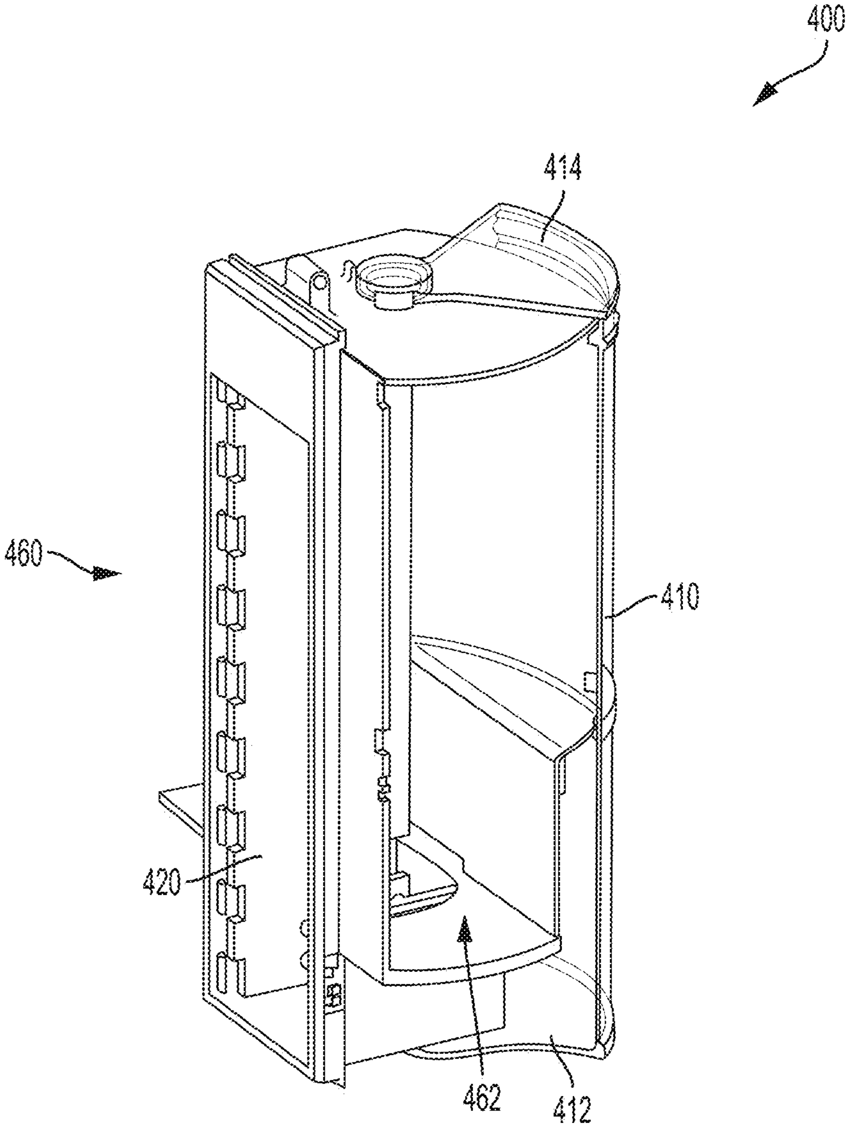
FIG. 18B shows a perspective view of a delivery area for a vending machine in an open configuration according to some embodiments.

In some embodiments, outer door 410 comprises a door that isolates delivery area 400 from an exterior of vending machine 10 when outer door 410 is closed (i.e., in a closed configuration 450 (see FIG. 18A)). In some embodiments, when outer door 410 is opened (i.e., in an open configuration 460 (see FIG. 18B)), an opening 462 is formed, allowing consumers access to delivery area 400 so that vending product 12 can be retrieved. In some embodiments, outer door 410 moves from closed configuration 450 to open configuration 460 by mechanical interaction with delivery cup 420. In some embodiments, outer door 410 slides open. In some embodiments, outer door 410 rotates open. In some embodiments, outer door 410 opens in direction 452, as shown in FIG. 18A. In some embodiments, outer door 410 comprises a bottom plate 412 and a top plate 414. In some embodiments, bottom plate 412 and top plate 414 connect outer door 410 to delivery area 400 by a rotatable attachment. In some embodiments, the attachment is spring-loaded to bias outer door 410 to be in closed configuration 450.

Figure 19:
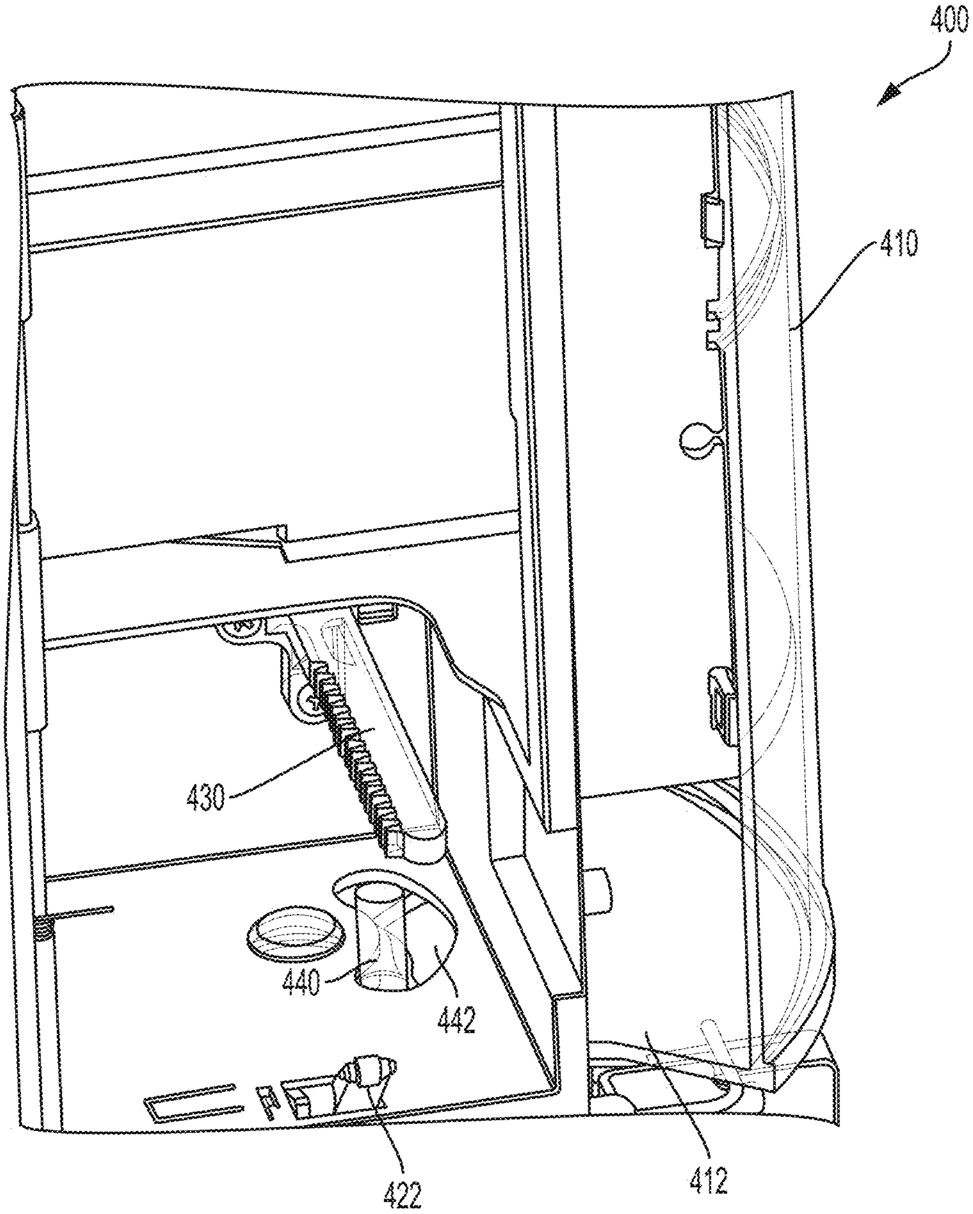
FIG. 19 shows an interior view of a delivery area for a vending machine according to some embodiments.

In some embodiments, as shown, for example, in FIG. 19, bottom plate 412 includes a projection 440 that protrudes into delivery area 400. In some embodiments, projection 440 protrudes through a slot 442. In some embodiments, slot 442 is curved. In some embodiments, pushing surface 222 of delivery cup 200 is configured to push projection 440 along slot 442. In some embodiments, as projection 440 moves along slot 442, outer door 410 opens.

In some embodiments, as shown, for example, in FIG. 19, rack 430 is disposed within delivery area 400 in a fixed manner. In some embodiments, pinion gear 226 of delivery cup 200 is configured to interact with rack 430 as delivery cup 200 enters delivery area 400. The teeth of rack 430 may engage with the teeth of pinion gear 226, thus rotating pinion gear 226 as delivery cup 200 continues to move into delivery area 400. In some embodiments, the rotation of pinion gear 226 rotates receptacle 210, thus presenting vending product 12 to the consumer. In some embodiments, the interaction between pinion gear 226 and rack 430 and the interaction between pushing surface 222 and projection 440 occur at about the same time. For example, these interactions may be simultaneous, or these interactions may at least partially overlap in timing. Thus, in some embodiments, as outer door 410 opens (allowing the consumer to view within delivery area 400), receptacle 210 rotates. These combined motions may add to the effects or user experience of presenting vending product 12 to the consumer. For example, after outer door 410 is at least partially opened, the consumer may view receptacle 210 finish rotating to present vending product 12 to the consumer. In some embodiments, vending product 12 rotates with the rotation of receptacle 210.

In some embodiments, inner door 420 isolates delivery area 400 from the storage space 20 of vending machine 10. In some embodiments, inner door 420 comprises a hinged door. In some embodiments, inner door 420 opens into delivery area 400 in direction 454, as shown in FIG. 18A. In some embodiments, inner door 420 is pushed open by delivery cup 200. In some embodiments, inner door 420 is locked. For example, inner door 420 may include a locking mechanism 422, as shown, for example, in FIG. 19. In some embodiments, locking mechanism 422 blocks inner door 420 from opening inward in direction 454. In some embodiments, locking mechanism 422 may be pressed down to unlock inner door 420. In some embodiments, projection 224 of delivery cup 200 is configured to interact with locking mechanism 422 as delivery cup 200 enters delivery area 400. In some embodiments, projection 224 extends farther out than the rest of delivery cup 200 (i.e., closer to delivery area 400). Thus, projection 224 may unlock inner door 420 by pressing down locking mechanism 422 prior to delivery cup 200 pushing on inner door 420 to open inner door 420. In some embodiments, inner door 420 may be unlocked via other mechanisms. For example, in some embodiments, inner door 420 may be configured to unlock itself when delivery cup 200 approaches. In some embodiments, delivery cup 200 may send a signal to inner door 420 when delivery cup approaches delivery area 400, for example, using wireless communication technology such as RFID, Bluetooth, NFC, etc. Other interactions or mechanisms may also be used.

In some embodiments, inner door 420 cannot be opened from within delivery area 400. In some embodiments, inner door 420 acts as an anti-vandal door to prevent theft. In some embodiments, inner door 420 includes a horizontal shelf 424 (see FIGS. 20A and 20B) to prevent a person from pressing down on locking mechanism 422 to unlock inner door 420.

Figure 20D:
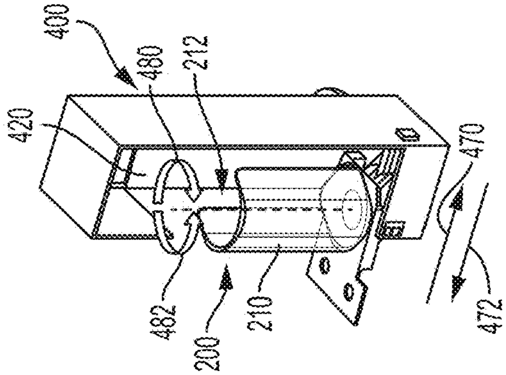
FIGS. 20A-20G show an operation of a delivery cup entering a delivery area of a vending machine according to some embodiments.
Figure 20C:
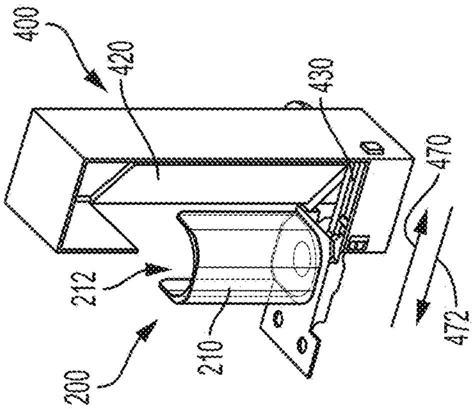
Figure 20B:
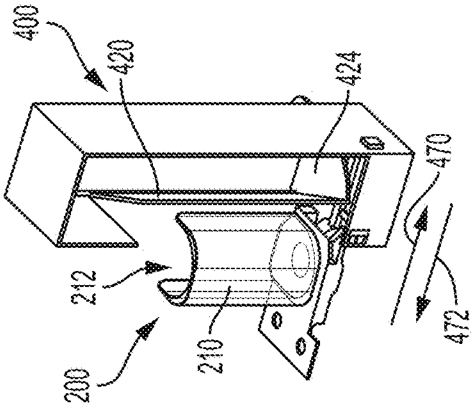
Figure 20A:
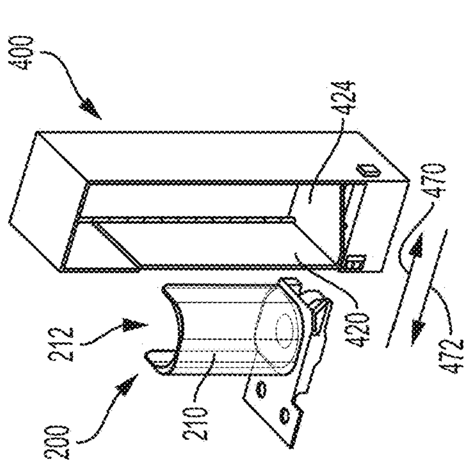
Figure 20G:
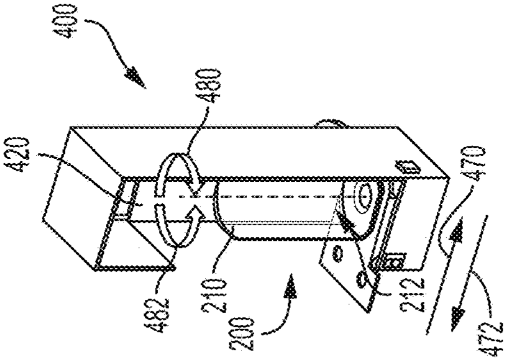
Figure 20F:
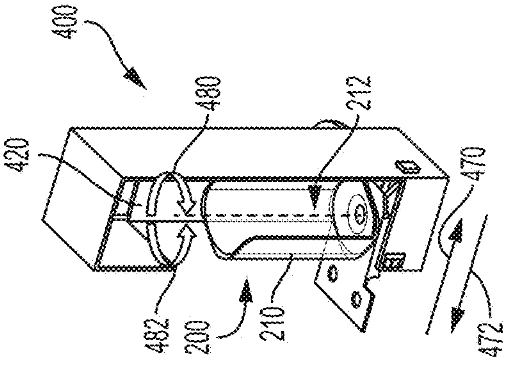
Figure 20E:
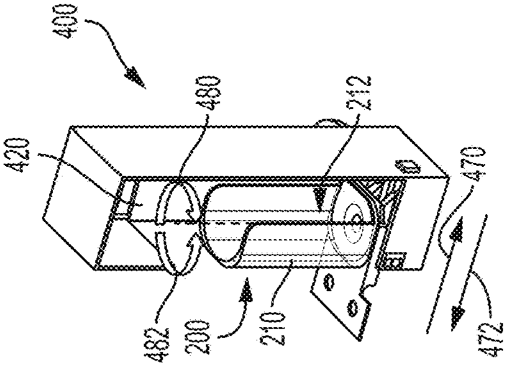

The interaction between delivery cup 200 and delivery area 400 to unlock and open inner door 420 and to rotate receptacle 210 so that vending product 12 is presented to a consumer is shown in FIGS. 20A-20G. In some embodiments, delivery cup 200 moves in delivery cup enter direction 470 to enter delivery area 400 and moves in delivery cup exit direction 472 to exit delivery area 400. In some embodiments, inner door 420 is locked in the closed position, as shown in FIG. 20A. In some embodiments, horizontal shelf 424 may prevent a person from unlocking inner door 420. In some embodiments, as delivery cup 200 approaches inner door 420, delivery cup 200 unlocks inner door 420 (e.g., via projection 224, wireless communication, or other mechanisms). In some embodiments, delivery cup 200 begins to push inner door 420 open, as shown in FIG. 20B. In some embodiments, as delivery cup 200 enters delivery area 400, as shown in FIG. 20C, pinion gear 426 (not visible in FIG. 20C) interacts with rack 430. In some embodiments, as shown in FIGS. 20D-20G, the interaction between pinion gear 426 and rack 430 as delivery cup 200 continues to enter delivery area 400 causes receptacle 210 to rotate in a delivery cup open rotation direction 480. In some embodiments, the total possible rotation comprises 180 degrees. In some embodiments, delivery cup open rotation direction 480 allows open side 212 to rotate from facing towards shelves 300 (i.e., away from the consumer) to facing towards the consumer (see FIG. 20G). In some embodiments, as delivery cup 200 withdraws from delivery area 400, the interaction between pinion gear 426 and rack 430 causes delivery cup 200 to rotate in a delivery cup close rotation direction 482.

Thus, vending machine 10 may be used to present vending products 12 to consumers in a sophisticated, yet simple, manner. In some embodiments, a consumer may pay for and select vending product 12 via user interface 18 (e.g., keypad, touch screen, and/or payment mechanism). In some embodiments, user interface 18 may include a keypad or touch screen, payment systems (bill, coin, card, etc.), a coin and/or bill return, a display screen, and other similar components. In some embodiments, the selection of vending product 12 at user interface 18 may be communicated to the controller that controls motors 114 and 124. In some embodiments, based on the communication to the controller, motors 114 and 124 operate to rotate top horizontal lead screw 110, bottom horizontal lead screw 105, and vertical lead screw 120 so that delivery cup 200 moves in the X-direction and the Y-direction to arrive at the appropriate shelf 300 for the selected vending product 12.

In some embodiments, delivery cup 200 moves to preset locations to receive vending products 12. In some embodiments, vending machine 10 knows when delivery cup 200 is at the right location based on controls from the controller of motors 114 and 124. In some embodiments, vending machine 10 knows when delivery cup 200 is in the right location based on communication between delivery cup 200 and shelf 300 (e.g., wireless communication technology such as RFID, Bluetooth, NFC, etc.).

In some embodiments, delivery cup 200 actuates gate 320 of shelf 300 to dispense one vending product 12 (e.g., via wireless communication technologies or via a mechanical actuator, such as solenoid 240 and plunger 242). In some embodiments, gate 320 remains open based on a timed pulse that is long enough to allow one vending product 12 to dispense from shelf 300.

In some embodiments, delivery cup 200 senses when vending product 12 is within delivery cup 200 (e.g., via sensor 230, such as an ultrasound sensor, or via pressure sensor). In some embodiments, delivery cup 200 sends a communication to the controller of motors 114 and 124 that vending product 12 has been loaded onto delivery cup 200. In some embodiments, after the selected vending product 12 is loaded into delivery cup 200, the controller drives motors 114 and 124 to rotate top horizontal lead screw 110, bottom horizontal lead screw 105, and vertical lead screw 120 so that delivery cup 200 moves in the X-direction and the Y-direction to arrive at delivery area 400. In some embodiments, delivery cup 200 interacts with delivery area 400 to unlock and open inner door 420, open outer door 410, and rotate receptacle 210 (e.g., with the mechanisms described above). In some embodiments, the combination of these interactions presents vending product 12 to the consumer and provides the consumer with access to retrieve the selected vending product 12.

In some embodiments, vending product 12 is presented to the consumer in an upright manner. In some embodiments, vending product 12 is presented to the consumer without being dropped. In some embodiments, vending product 12 is presented to the consumer without the consumer needing to open outer door 410 or manually open or push any aspect of vending machine 10 other than user interface 18 (e.g., to select and pay for vending product 12). In some embodiments, vending product 12 is presented to the consumer by rotating vending product 12.

In some embodiments, delivery cup 200 senses when vending product 12 has been removed from delivery cup 200 (e.g., via sensor 230, such as an ultrasound sensor, or via pressure sensor). In some embodiments, delivery cup 200 sends a signal to the controller of motors 114 and 124 that vending product 12 has been retrieved. In some embodiments, after vending product 12 has been retrieved, the controller drives motors 114 and 124 to rotate top horizontal lead screw 110, bottom horizontal lead screw 105, and vertical lead screw 120 so that delivery cup 200 moves in the X-direction and the Y-direction to return to a starting position. In some embodiments, as delivery cup 200 leaves delivery area 400, outer door 410 is closed, receptacle 210 rotates back to its starting position, and inner door 420 is closed and locked.

In some embodiments, if a consumer does not retrieve vending product 12 after a pre-determined amount of time, the controller may drive motors 114 and 124 to rotate top horizontal lead screw 110, bottom horizontal lead screw 105, and vertical lead screw 120 so that delivery cup 200 moves in the X-direction and the Y-direction to return to its starting position. When this happens, vending machine 10 may display (e.g. via user interface 18) that vending product 12 has not been retrieved. The next consumer that approaches vending machine 10 (seeing this message) may use user interface 18 to cause vending machine 10 to dispense the loaded vending product 12 in the manner described above before another vending product 12 is selected.

Figure 21:
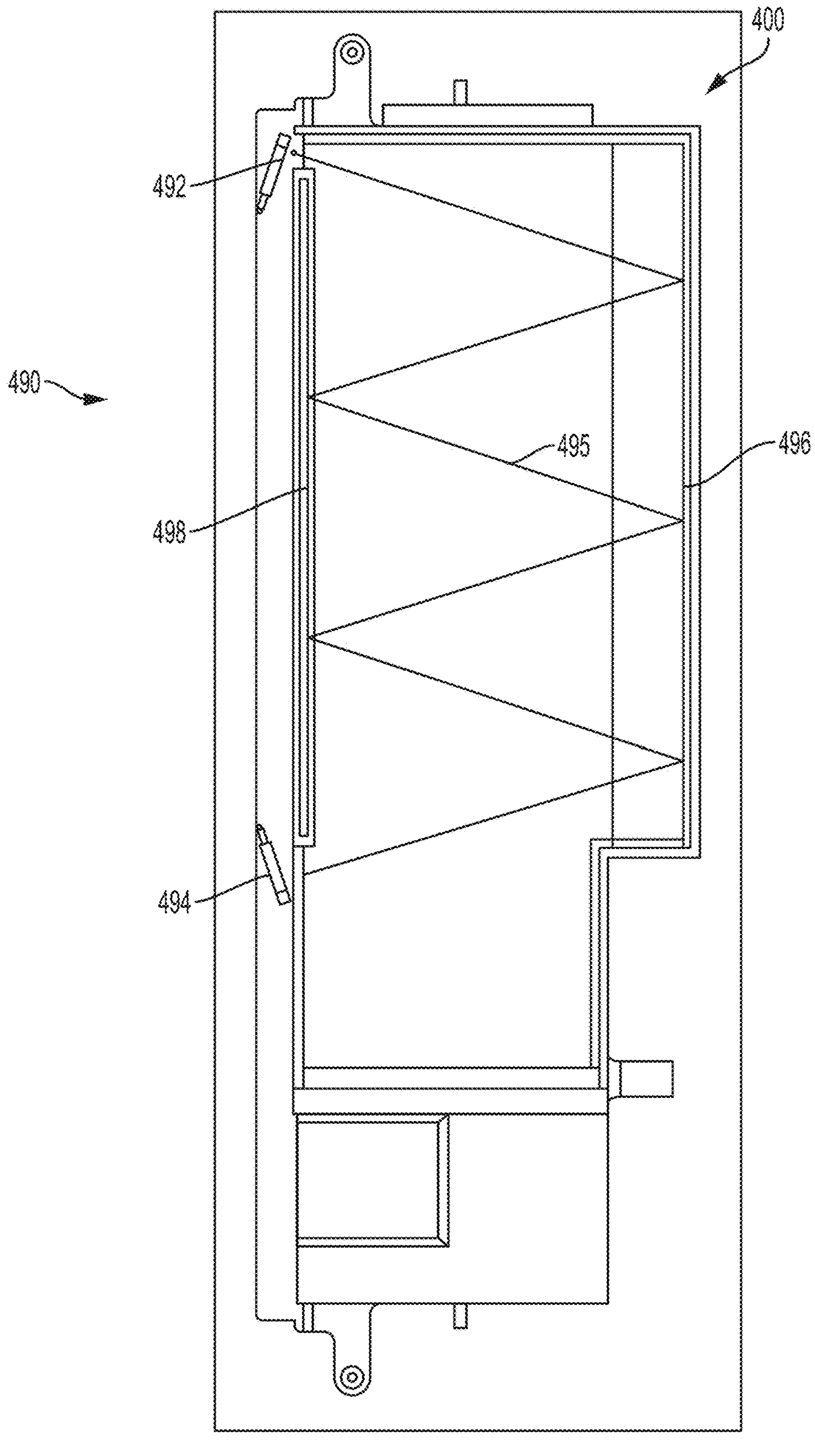
FIG. 21 shows a front view of a delivery area of a vending machine according to some embodiments.

In some embodiments, as shown, for example, in FIG. 21, delivery area 400 comprises a retrieval sensor 490, such as, for example, a hand presence sensor 490. Hand presence sensor 490 may ensure that delivery cup 200 will not start moving while a consumer retrieval is in progress, for example, while a consumer's hand is in delivery area 400. For example, if sensor 230 does not sense vending product 12 (i.e., senses that vending product 12 has been removed), delivery cup 200 may begin to return to a starting position, as described above. Similarly, after a pre-determined amount of time, even if vending product 12 is not retrieved, delivery cup 200 may begin to return to a starting position, as described above. However, if hand presence sensor 490 senses a consumer's hand in delivery area 400 in either of these situations, the return of delivery cup 200 to a starting position will be delayed until the consumer's hand is no longer sensed in delivery area 400.

In some embodiments, hand presence sensor 490 comprises a laser emitter 492 and a receiver 494. In some embodiments, laser emitter 492 and receiver 494 are disposed at a front portion of delivery area 400 so that a consumer's hand is sensed if the hand is within delivery area 400 at all. While FIG. 21 shows laser emitter 492 disposed above receiver 494, in some embodiments, laser emitter 492 and receiver 494 may be in opposite positions (i.e., laser emitter 492 below receiver 494). In some embodiments, hand presence sensor 490 comprises two opposing mirrors 496, 498 on each side of delivery area 400. In some embodiments, laser emitter 492 transmits a beam of light 495, which is reflected back and forth between mirrors 496, 498 until receiver 494 receives beam of light 495. When a consumer's hand enters delivery area 400, the hand will block beam of light 495 so that beam of light 495 does not reach receiver 494, thus allowing hand presence sensor 490 to determine when a consumer's hand is within delivery area 400. In some embodiments, laser emitter 492, receiver 494, and mirrors 496, 498 are positioned and angled to ensure that a hand will be sensed at any point along the entrance to delivery area 400.

Figure 22:
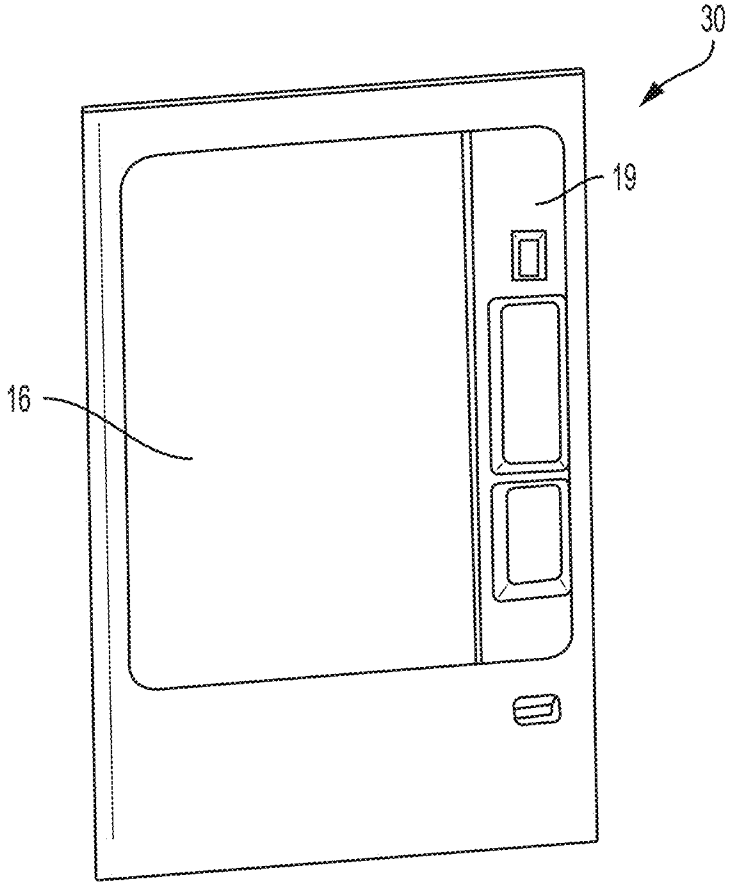
FIG. 22 shows a perspective view of a door for a vending machine according to some embodiments.

In some embodiments, vending machine 10 comprises a front door 30, as shown, for example, in FIG. 22. In some embodiments, door 30, when opened, provides access to storage space 20 and to the electrical system of vending machine. In some embodiments, door 30 may be opened to reload shelves 300 with vending products 12, adjust shelves 300, or for other maintenance or service of vending machine 10. In some embodiments, door 30 comprises a hinged door. In some embodiments, door 30 comprises front panel 16. In some embodiments, door 30 comprises plastic cover 19. In some embodiments, plastic cover 19 accommodates user interface 18. In some embodiments, door 30 is modular, thus allowing the same door 30 to be used for vending machines with different user interfaces 18 (e.g., keypad vs. touch screen).

Figure 23:
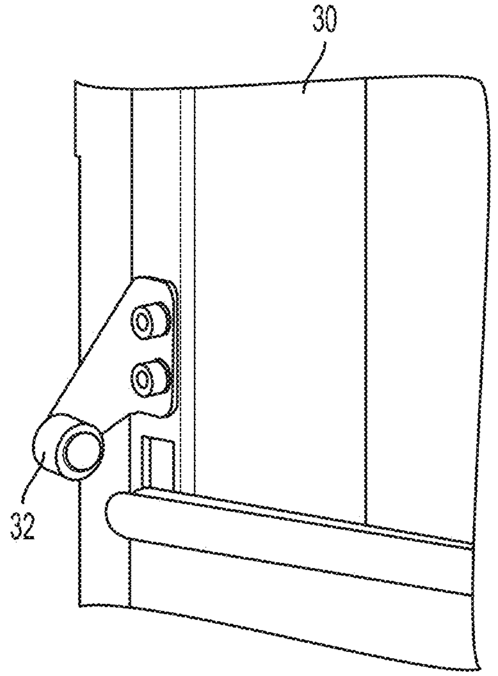
FIG. 23 shows a partial interior view of a door for a vending machine according to some embodiments.
Figure 24:
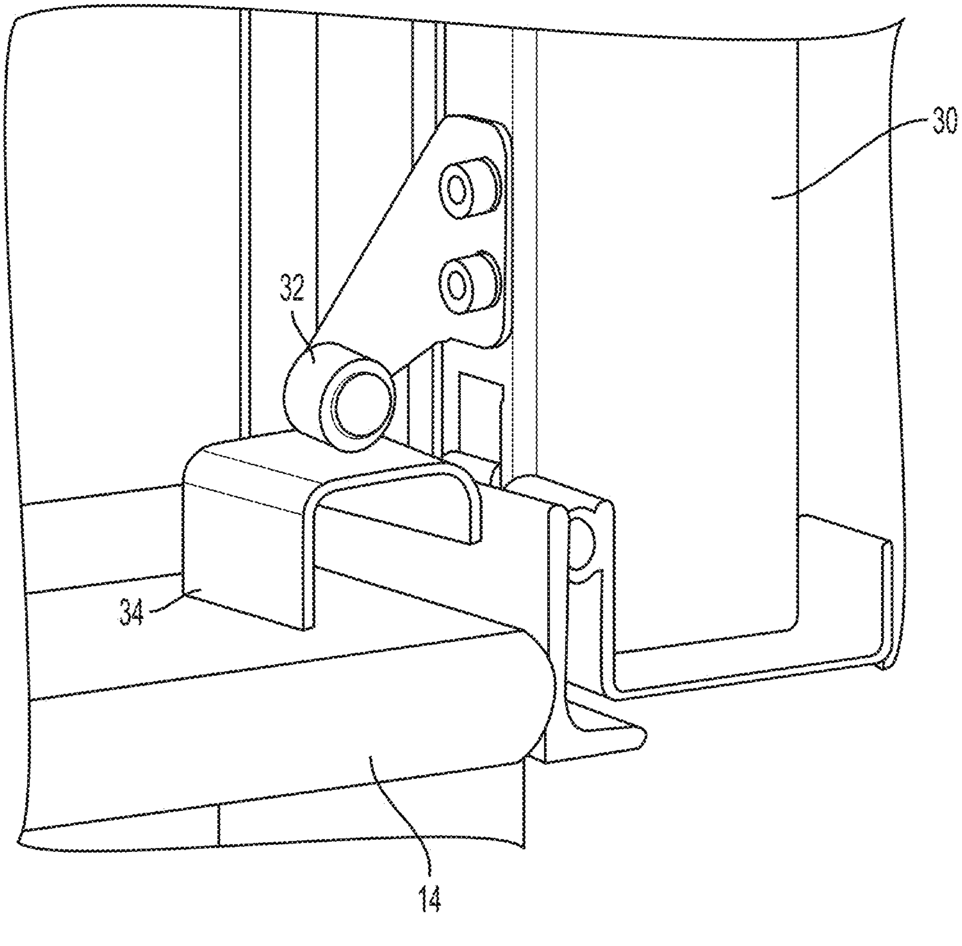
FIG. 24 shows a partial interior view of a door for a vending machine according to some embodiments.

In some embodiments, door 30 comprises a roller 32, as shown, for example in FIGS. 23 and 24. In some embodiments, roller 32 is disposed on an inside frame of door 30. In some embodiments, roller 32 is disposed at a bottom portion of door 30. In some embodiments, roller 32 may be fixedly attached to door 30. In some embodiments, roller 32 rests on a bracket 34 disposed on a bottom portion of exterior body 14, as shown in FIG. 24, when door 30 is closed. In some embodiments, this configuration may help align door 30 to achieve an accurate closing position and proper seal each time door 30 is closed.

Figure 25:
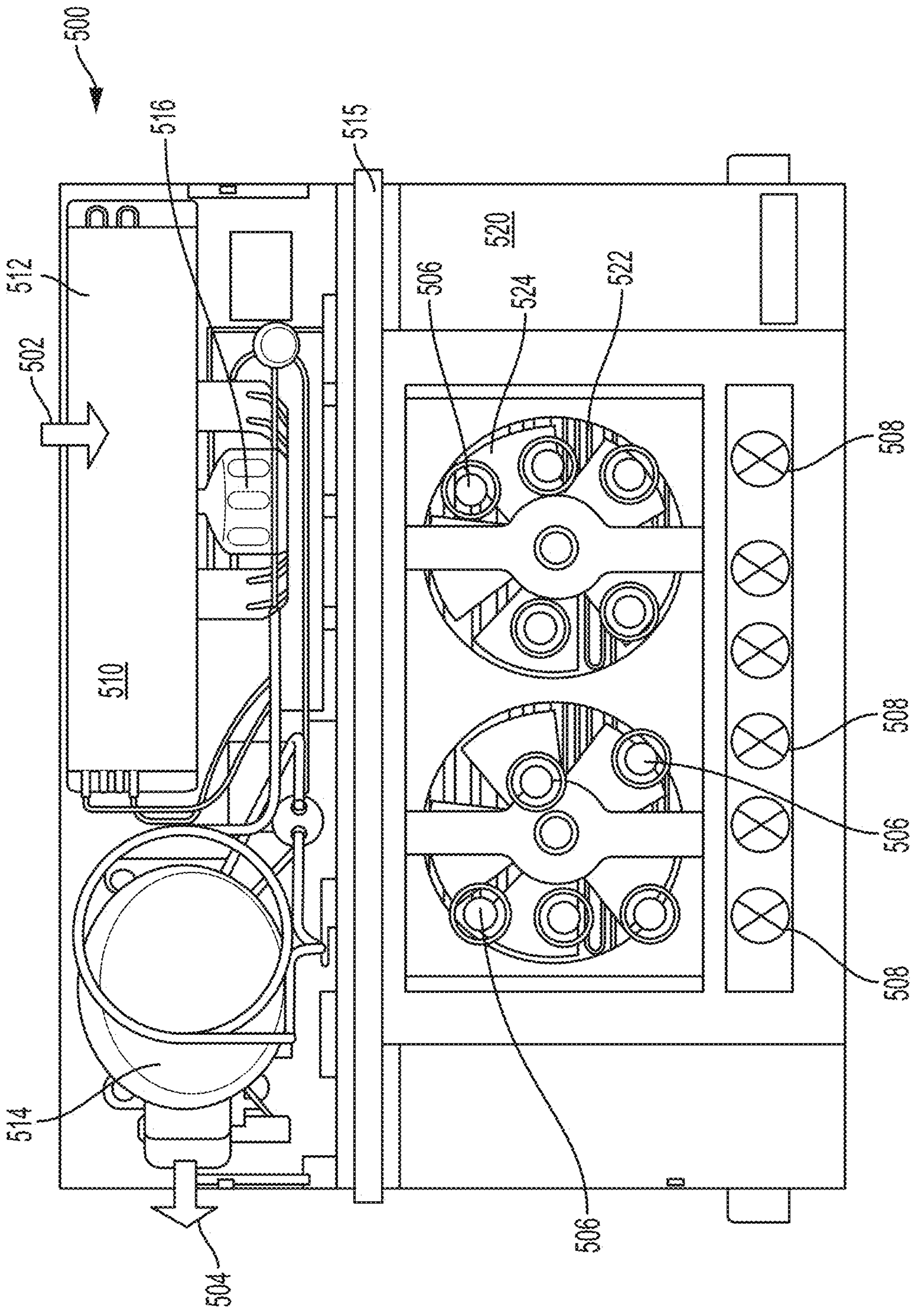
FIG. 25 shows a top view of a refrigeration unit for a vending machine according to some embodiments.

In some embodiments, vending machine 10 comprises a self-contained refrigeration unit 500, as shown in FIG. 25. In some embodiments, refrigeration unit 500 comprises a hot side 510 and a cold side 520. In some embodiments, hot side 510 and cold side 520 are sealed to prevent mixing of hot and cold air. In some embodiments, refrigeration unit 500 comprises an insulated wall 515 to separate hot side 510 and cold side 520.

In some embodiments, hot side 510 comprises a condenser 512, a compressor 514, and a fan 516. In some embodiments, air comes into hot side 510 via air intake 502 and exits hot side 510 via air exhaust 504. In some embodiments, cold side 520 comprises an evaporator 522 and a fan 524. In some embodiments, cold air 506 flows out of cold side 520 into storage space 20 to cool vending products 12. In some embodiments, warm air 508 returns from storage space 20 back into cold side 520.

Figure 26:
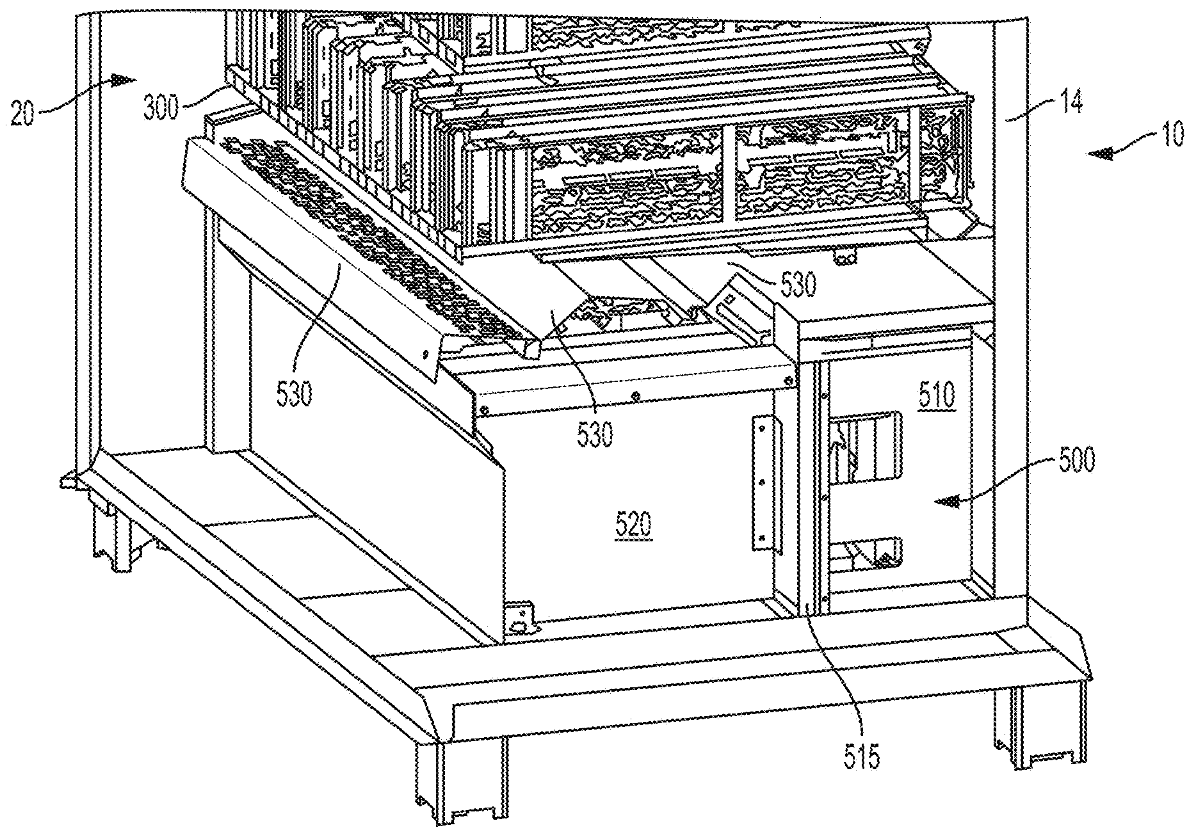
FIG. 26 shows a perspective view of a refrigeration unit within a vending machine according to some embodiments.

In some embodiments, vending machine 10 comprises cover panels 530 disposed above refrigeration unit 500, as shown in FIG. 26. In some embodiments, cover panels 530 attach to vending machine 10 to form ducts that carry cold air 506 into storage space 20 and that carry warm air 508 back from storage space 20 into refrigeration unit 500.

In some embodiments, because refrigeration unit 500 is self-contained, refrigeration unit 500 can be easily removed and inserted for maintenance, service, or replacement. In some embodiments, refrigeration unit 500 operates to keep vending products 12 at an appropriate temperature.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A vending machine comprising:

a shelf containing a vending product;

a delivery area comprising a rack, an outer door, and a projection mechanically linked to the outer door and protruding through a slot; and a delivery cup configured to transport the vending product to the delivery area, the delivery cup comprising:

an actuator configured to send a signal to the shelf to dispense the vending product onto the delivery cup, a sensor configured to sense a presence of the vending product within the delivery cup, a pinion gear configured to interact with the rack as the delivery cup moves the vending product into the delivery area, and a pushing surface configured to push the projection to mechanically open the outer door and provide access to the vending product within the delivery area from the exterior of the vending machine.

2. The vending machine of claim 1, wherein the delivery cup is configured to stay in the delivery area until it senses that the vending product is not present within the delivery cup.

3. The vending machine of claim 1, wherein the delivery cup further comprises:

a receptacle, wherein the sensor senses the presence of the vending product within the delivery cup by the weight of the receptacle.

4. The vending machine of claim 1, wherein the delivery cup further comprises:

a receptacle, wherein the pinion gear is coupled to the receptacle such that rotation of the pinion gear by interaction with the rack causes rotation of the receptacle.

5. The vending machine of claim 1, wherein the actuator comprises a mechanical actuator configured to open the shelf to dispense the vending product onto the delivery cup.

6. The vending machine of claim 5, wherein the mechanical actuator comprises a solenoid and a plunger, and wherein the solenoid is configured to activate the plunger and the plunger is configured to open the gate to dispense the vending product onto the delivery cup.

7. The vending machine of claim 1, wherein the delivery cup further comprises:

a platform, wherein the platform comprises the pinion gear and the pushing surface.

8. The vending machine of claim 7, wherein the delivery cup further comprises:

a receptacle configured to move relative to the platform.

9. A vending machine comprising:

a shelf containing a vending product;

a delivery area; and a delivery cup configured to transport the vending product to the delivery area, the delivery cup comprising:

a sensor configured to sense a presence or absence of the vending product is within the delivery cup, and a receptacle comprising holes configured to facilitate sensing by the sensor of the vending product, wherein the delivery cup is configured to stay in the delivery area until it senses the absence of the vending product.

10. The vending machine of claim 9, wherein the delivery cup is configured to stay by the shelf until it senses the vending product on the delivery cup.

11. The vending machine of claim 9, wherein the holes comprise a first hole on a first side of the receptacle and a second hole on a second side of the receptacle, the second side opposite the first side.

12. The vending machine of claim 9, wherein the sensor comprises an ultrasound sensor.

13. The vending machine of claim 9, wherein the sensor comprises a pressure sensor.

14. The vending machine of claim 9, wherein a receptacle comprising an open side configured to face the shelf.

15. A vending machine comprising:

a shelf containing a vending product, the shelf configured to hold the vending product on the shelf; and a delivery cup configured to receive the vending product from the shelf and transport the vending product to a delivery area, wherein the shelf is configured to send a signal to the delivery cup indicating that the delivery cup has arrived at a proper location, and wherein the delivery cup comprises an actuator configured to actuate the shelf to dispense the vending product onto the delivery cup.

16. The vending machine of claim 15, wherein the signals between the shelf and the delivery cup utilize RFID, NFC, or Bluetooth technology.

17. The vending machine of claim 15, wherein the actuator is a mechanical actuator.

18. The vending machine of claim 17, wherein the actuator is actuated for a timed pulse to send the signal to the shelf to dispense the vending product onto the delivery cup.

19. The vending machine of claim 15, wherein the shelf is configured to send a signal to the delivery cup when the shelf is open.

20. The vending machine of claim 19, wherein the delivery cup is configured to send the signal to the shelf to dispense the vending product onto the delivery cup after receiving the signal that the shelf is open.

* * * * *